(12) United States Patent
Fujita et al.

(10) Patent No.: US 8,433,247 B2
(45) Date of Patent: Apr. 30, 2013

(54) RADIO COMMUNICATION SYSTEM, RADIO COMMUNICATION APPARATUS AND RADIO COMMUNICATION METHOD

(75) Inventors: Masayuki Fujita, Kawasaki (JP); Gen Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 314 days.

(21) Appl. No.: 12/437,348

(22) Filed: May 7, 2009

(65) Prior Publication Data

US 2009/0275288 A1 Nov. 5, 2009

Related U.S. Application Data

(63) Continuation of application No. PCT/JP2006/322340, filed on Nov. 9, 2006.

(51) Int. Cl.
*H04B 7/00* (2006.01)

(52) U.S. Cl.
USPC ..................... 455/41.3; 455/404.2

(58) Field of Classification Search ............... 455/404.1, 455/404.2, 450, 451, 452.1, 455, 456.1, 456.2, 455/457, 458, 464, 24, 41.1, 41.2, 41.3, 500, 455/501, 505, 509, 516, 521, 518; 701/207, 701/214; 340/988, 991, 992, 993, 438
See application file for complete search history.

(56) References Cited

U.S. PATENT DOCUMENTS

| | | | |
|---|---|---|---|
| 6,725,014 B1 * | 4/2004 | Voegele | 455/41.2 |
| 7,046,130 B2 * | 5/2006 | Kusano | 340/439 |
| 7,650,162 B2 * | 1/2010 | Suzuki | 455/550.1 |
| 2004/0192331 A1 * | 9/2004 | Gorday et al. | 455/456.1 |
| 2004/0203381 A1 * | 10/2004 | Cahn et al. | 455/41.2 |
| 2005/0065715 A1 * | 3/2005 | Watanabe | 701/200 |
| 2007/0043502 A1 * | 2/2007 | Mudalige et al. | 701/207 |

FOREIGN PATENT DOCUMENTS

| | | |
|---|---|---|
| JP | 10283439 | 10/1998 |
| JP | 11353434 | 12/1999 |
| JP | 2004166134 | 6/2004 |
| JP | 2005084790 | 3/2005 |

OTHER PUBLICATIONS

International Search Report dated Feb. 6, 2007.

* cited by examiner

*Primary Examiner* — Ping Hsieh
(74) *Attorney, Agent, or Firm* — Fujitsu Patent Center

(57) ABSTRACT

In a radio communication system, a first radio communication station transmits a radio signal including information for designating a condition for a radio communication counterpart. A second radio communication station which receives the radio signal transmitted by the one radio communication station, and transmits a response radio signal when a situation of the second radio communication station meets the condition designated by the information included in the radio signal. The condition for a radio communication counterpart is whether the radio communication counterpart moves, and the second radio communication station transmits the response radio signal when the second radio communication station meets the condition that the radio communication counterpart moves.

8 Claims, 25 Drawing Sheets

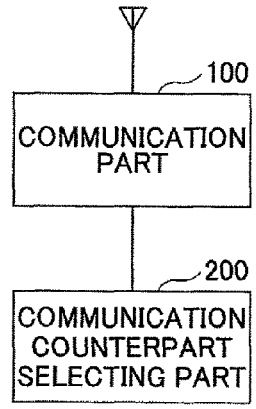
FIG.1A
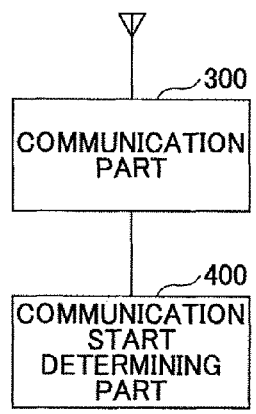
FIG.1B
FIG.2
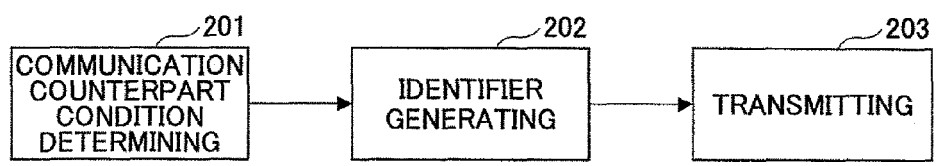

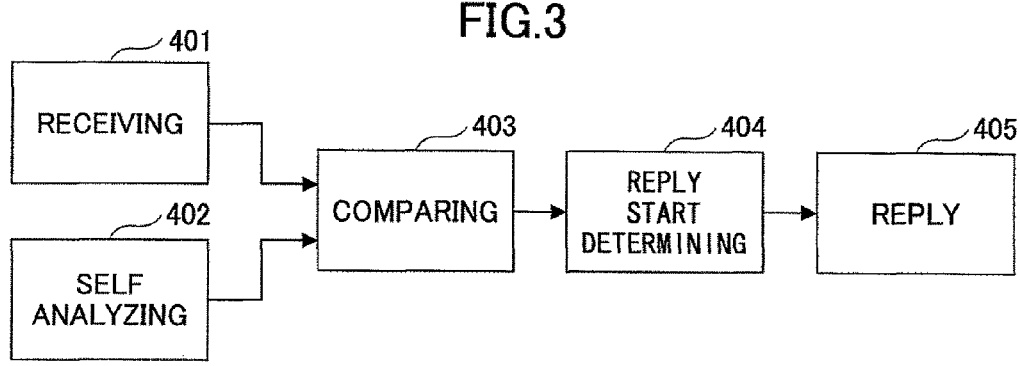
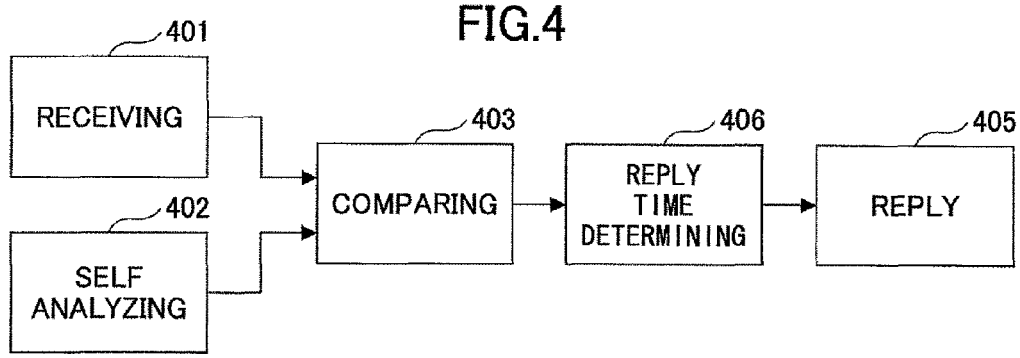
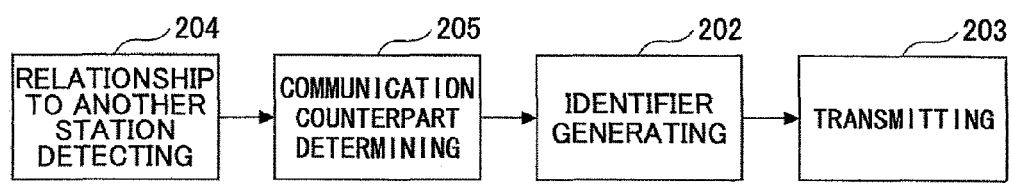
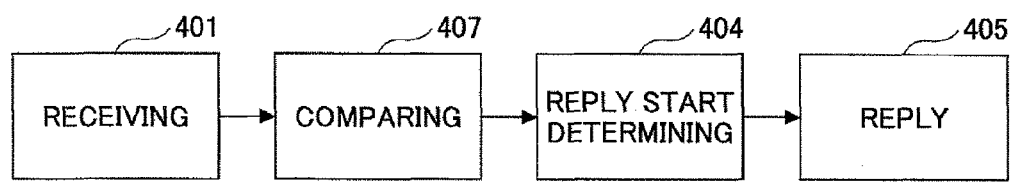

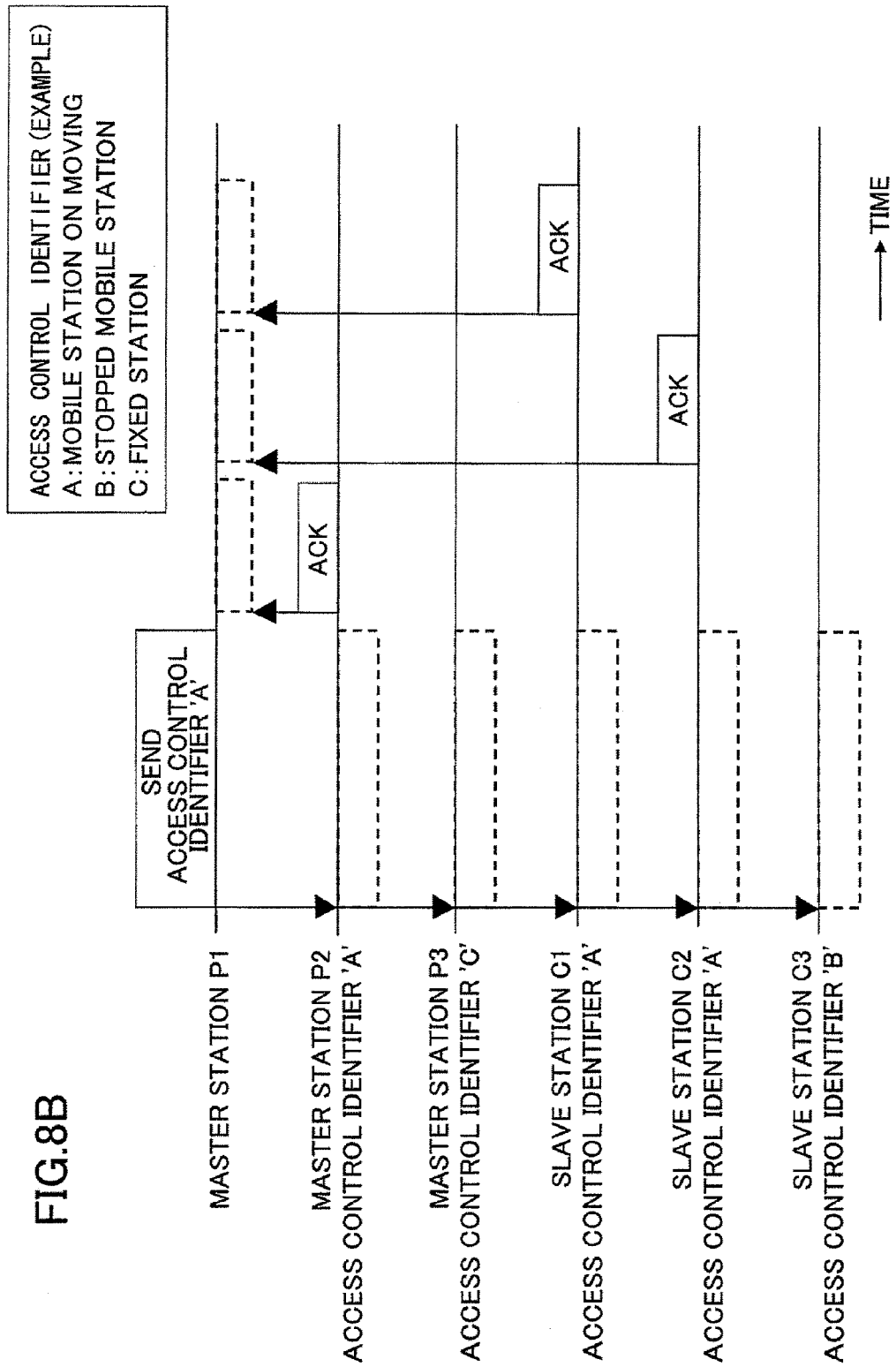

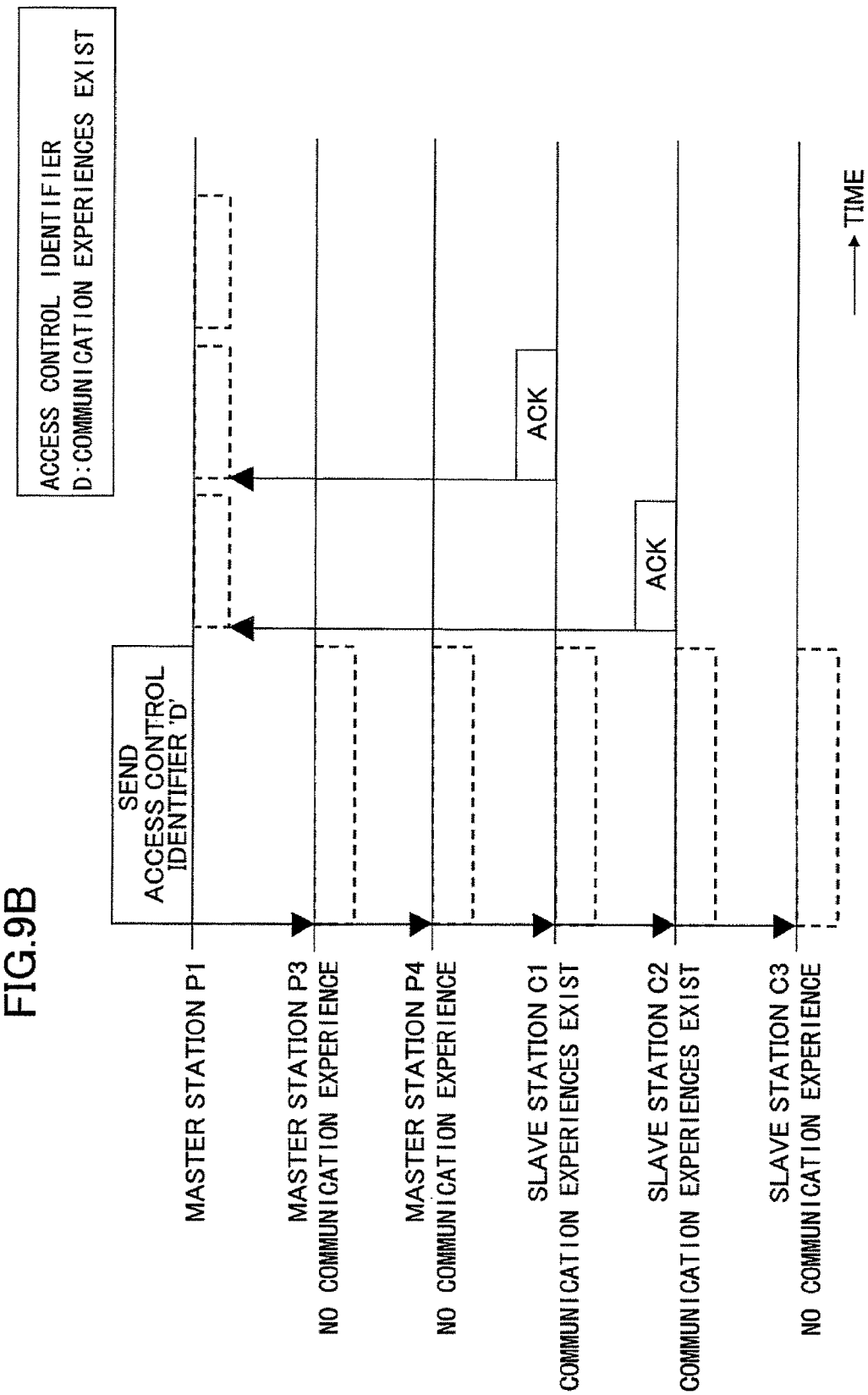

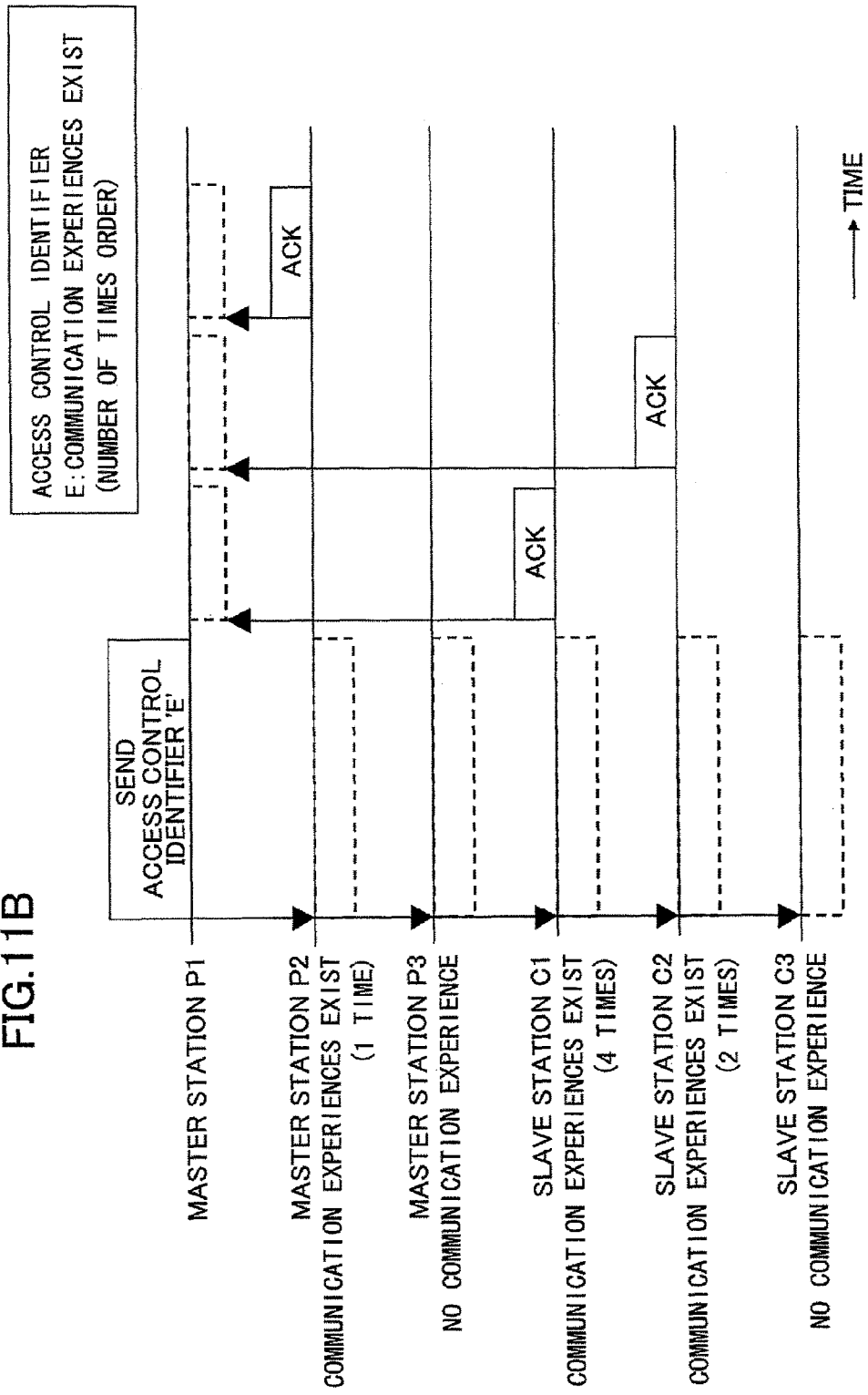

FIG.12A

TIME T1

| STATION | RELATIVE DISTANCE | RELATIVE SPEED |
|---|---|---|
| MASTER STATION P2 | 32m | -40Km/H |
| MASTER STATION P3 | 47m | -80Km/H |
| SLAVE STATION C1 | 25m | 0Km/H |
| SLAVE STATION C2 | 38m | -10Km/H |
| SLAVE STATION C3 | 17m | -40Km/H |

FIG.12B

TIME T2

| STATION | RELATIVE DISTANCE | RELATIVE SPEED |
|---|---|---|
| MASTER STATION P2 | 20m | -40Km/H |
| MASTER STATION P3 | 23m | -80Km/H |
| SLAVE STATION C1 | 25m | 0Km/H |
| SLAVE STATION C2 | 35m | -10Km/H |
| SLAVE STATION C3 | 5m | -40Km/H |

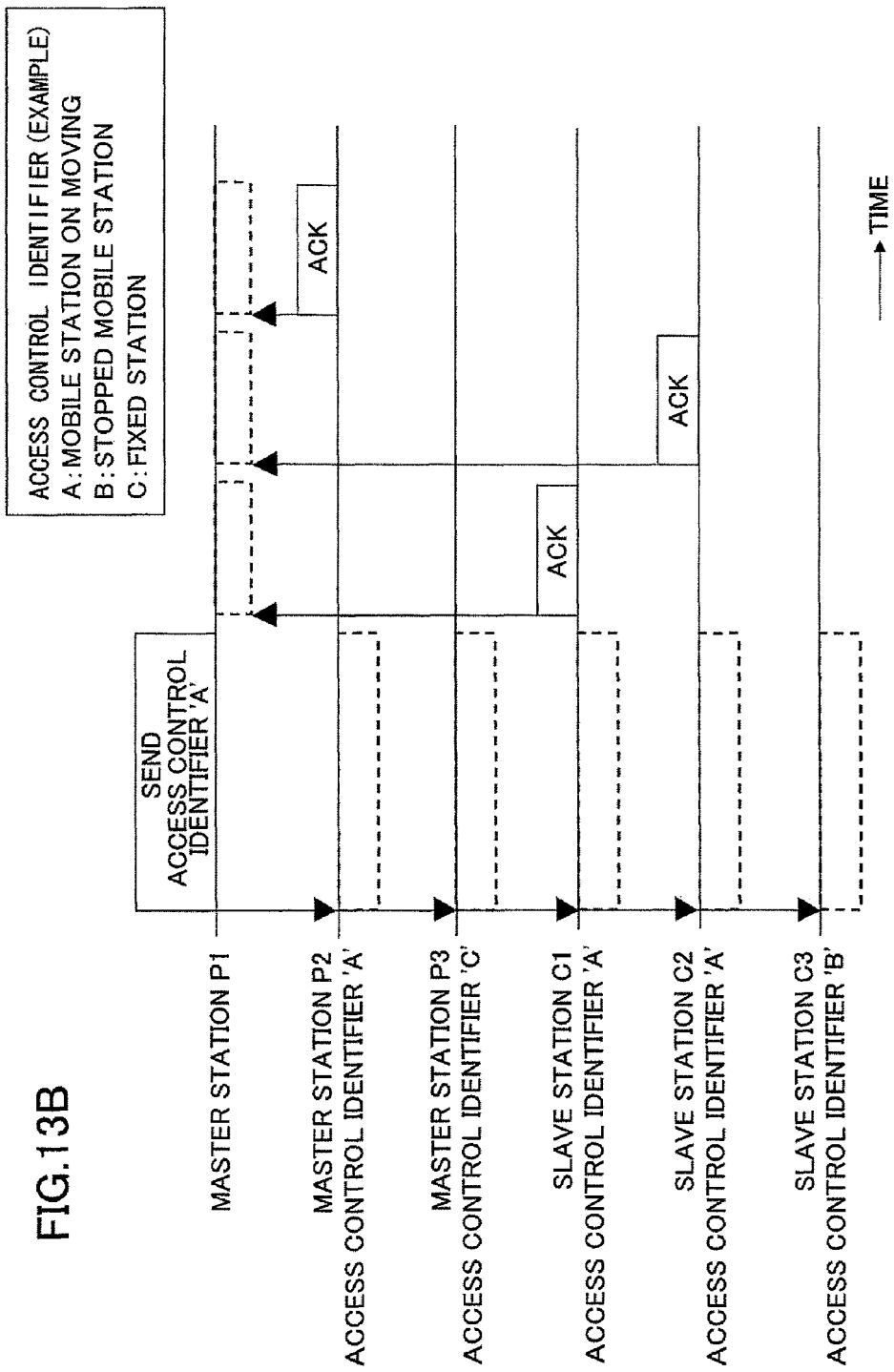

US 8,433,247 B2

RADIO COMMUNICATION SYSTEM, RADIO COMMUNICATION APPARATUS AND RADIO COMMUNICATION METHOD

CROSS-REFERENCE TO RELATED APPLICATIONS

This application is a U.S. continuation application filed under 35 USC 111(a) claiming benefit under 35 USC 120 and 365(c) of PCT application JP2006/322340, filed Nov. 9, 2006. The entire contents of which are incorporated herein by reference.

FIELD

The embodiment discussed herein is directed to a radio communication system, a radio communication apparatus and a radio communication method.

BACKGROUND

Such a communication system is known that, when an instruction/correspondence with data is transmitted to a plurality of mobile stations from a base station, a mobile station number and reply order data of each mobile station are attached to the instruction/correspondence data, and the instruction/correspondence data is transmitted to the plurality of mobile stations. Each mobile station having received the instruction/correspondence data replies with a confirmation signal according to the reply order. Thereby, data collision is avoided.

Patent Document 1: Japanese Laid-Open Patent Application No. 2004-166134
Non-patent Document 1: www.mlit.go.jp/jidosha/anzen/asv/index.html Oct. 26, 2006

SUMMARY

In the embodiment, in a communication system, a first radio communication station transmits a radio signal including information for designating a condition for a radio communication counterpart. A second radio communication station which receives the radio signal transmitted by the first radio communication station transmits a response radio signal when a situation of the second radio communication station meets the condition designated by the information included in the radio signal. The condition for a radio communication counterpart is whether the radio communication counterpart moves, and the second radio communication station transmits the response radio signal when the second radio communication station meets the condition of whether the radio communication counterpart moves.

It is to be understood that both the foregoing general description and the following detailed description are exemplary and explanatory only and are not restrictive of the invention, as claimed.

BRIEF DESCRIPTION OF DRAWINGS

FIG. 1A depicts a block diagram for illustrating a configuration of a first radio communication station in a communication system in an embodiment;
FIG. 1B depicts a block diagram for illustrating a configuration of a second radio communication system in the communication system in the embodiment;
FIG. 2 depicts a block diagram for illustrating a configuration of one example of a communication counterpart selecting part depicted in FIG. 1A;
FIG. 3 depicts a block diagram for illustrating a configuration of one example of a communication counterpart determining part depicted in FIG. 1B;
FIG. 4 depicts a block diagram for illustrating a configuration of another example of the communication counterpart determining part depicted in FIG. 1B;
FIG. 5 depicts a block diagram for illustrating a configuration of another example of the communication counterpart selecting part depicted in FIG. 1A;
FIG. 6 depicts a block diagram for illustrating a configuration of further another example of the communication counterpart determining part depicted in FIG. 1B;
FIG. 8B depicts a time chart for illustrating of the communication system in the embodiment 1;
FIG. 9B depicts a time chart for illustrating the communication system in the embodiment 2;
FIG. 11A illustrates a situation of a communication system in an embodiment 4;
FIG. 11B depicts a time chart for illustrating the communication system in the embodiment 4;
FIGS. 12A and 12B depict measurement result examples for illustrating a communication system in an embodiment 5;
FIG. 13B depicts a time chart for illustrating the communication system in the embodiment 5.

Figure 7:
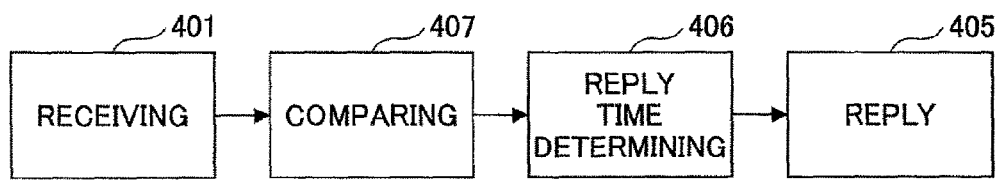
FIG. 7 depicts a block diagram for illustrating a configuration of further another example of the communication counterpart determining part depicted in FIG. 1B.

DESCRIPTION OF REFERENCE NUMERALS 100 communicating part
200 communication counterpart selecting part
201 communication counterpart condition determining part
202 identifier generating part
203 transmitting part
204 relationship to another station detecting part
205 communication counterpart determining part
300 communicating part
400 communication start determining part
401 receiving part
402 self analyzing part
403 comparing part
404 reply start determining part
405 reply part
406 reply time determining part

DESCRIPTION OF EMBODIMENTS

Embodiments relate to such radio communication systems and radio communication apparatuses that, in a condition where a plurality of second radio communication stations may respond to a signal transmitted from a first radio communication station, the number of the second communication stations which respond can be effectively controlled.

First, a reference example will be described now for the purpose of better understanding the embodiments. A communication system using a so-called RFID (Radio Frequency IdentiFication) tag is known as a communication system in which a plurality of second radio communication stations may respond to a signal transmitted from a first radio communication station.

In such a system, when many RFID tags simultaneously respond to a signal transmitted from a RFID reader/writer as a first radio communication station, data collision may occur between responding data.

In order to avoid or reduce such data collision, for example, in a system in which 1:n communication is carried out between a RFID reader/writer and RFID tags, an RFID tag receiving a transmission signal from the RFID reader/writer transmits a reply signal after waiting a random time interval, whereby data collision which may occur as a result of the plurality of RFID tags simultaneously replying can be avoided or reduced.

As mentioned above, in a communication system using RFID tags, when many RFID tags (i.e., slave stations) exist within a certain area, data collision may occur. When data collision occurs frequently, communication quality may degrade.

Further, in one example, as a result of all RFID tags (slave stations) replying to a signal transmitted from a RFID reader/writer, the RFID reader/writer may not communicates with a specific RFID tag even when the RFID reader/writer needs to communicate with the specific RFID tag.

According to the art discussed in the above-mentioned Patent Document 1, a reply order is to be determined for all mobile stations, and thus, a communication time for all the mobile stations are required. Therefore, even when a small number of mobile stations exist in the neighborhood, a long communication time may be required.

Further, in the system of the Patent Document 1, since also a base station may act as a mobile station, communication stations existing in the neighborhood may always change. Therefore, it may be difficult to attach reply order data for all possible mobile stations and ensure a reply time for all the possible mobile stations.

The embodiments are useful for the above-mentioned situations. That is, according to the embodiments, as will be described later, in a state where a plurality of second radio communication stations may respond to a signal transmitted from a first radio communication station, the number of the second communication stations which respond can be effectively controlled.

In the embodiments, a first radio communication station transmits a radio signal including information for designating a condition for determining a radio communication counterpart. A second radio communication station receives the radio signal transmitted by the first radio communication station, and transmits a response radio signal when a situation of the second radio communication station meets the condition for determining a communication counterpart designated by the information included in the received radio signal.

In this configuration, only the second communication stations, each of which has a situation meeting the condition for determining a communication counterpart designated by the information included in the radio signal, transmit response radio signals. As a result, even with a simple configuration, it is possible to effectively control the number of the second radio communication stations which respond for the first communication station.

As the condition for determining a communication counterpart, a condition as to whether a second radio communication station moves may be used. As a result, any second radio communication stations which are stopped do not meet the condition, and thus, do not transmit response radio signals. On the other hand, any second radio communication stations which are currently moving meet the condition and transmit response radio signals. Thus, it is possible to effectively control the number of the second radio communication stations which actually respond for the first communication station.

Thus, in the embodiments, it is possible to effectively control the number of the second radio communication stations which actually respond for the first communication station with a relatively simple configuration. Therefore, it is possible to positively carry out communication with predetermined communication counterparts in a communication system in which a plurality of second radio communication stations can respond to a signal transmitted from a first radio communication station.

Below, the embodiments will be described with reference to figures.

FIG. 1A depicts a block diagram of a configuration of a first radio communication station included in a communication system applicable to the embodiments. FIG. 1B depicts a block diagram of a configuration of a second radio communication station included in the communication system.

As depicted in FIG. 1A, the first radio communication station has a communicating part 100 and a communication counterpart determining part 200. As depicted in FIG. 1B, the second radio communication station has a communicating part 300 and a communication start determining part 400.

These first and second radio communication stations communicate one another via the respective communicating parts 100 and 300.

A system is assumed in which a plurality of the second radio communication stations exist for the single first radio communication station.

In such a system, as mentioned above, when the single first radio communication station transmits a signal and the plurality of second radio communication stations respond thereto simultaneously, data collision may occur, and thereby, normal communication may not be carried out.

In order to solve the problem, the first radio communication station selects some from the plurality of the second radio communication stations, for carrying out communication with, by the communication counterpart selecting part 200.

Further, each second radio communication station determines whether the second radio communication station is eligible to carry out communication with the first communication station, in the communication start determining part 400.

Functions of the communication counterpart selecting part 200 and the communication start determining part 400 will be described now in detail.

FIG. 2 depicts a functional block diagram for illustrating one example of a function of the communication counterpart selecting part 200.

The communication counterpart selecting part 200 has a communication counterpart condition determining part 201, an identifier generating part 202, and a transmitting part 203.

The communication counterpart condition determining part 201 determines a condition for determining a counterpart to communicate with. For example, the condition is such that communication is carried out with any second communication stations which are on moving.

The identifier generating part 202 generates an identifier indicating the determined condition based on the determination carried out by the communication counterpart condition determining part 201. In the above-mentioned example, an identifier indicating the condition of on moving is generated.

The transmitting part 203 transmits the identifier via the communicating part 100 by radio.

FIG. 3 depicts a functional block diagram for illustrating one example of a function of the communication start determining part 400.

The communication start determining part 400 in FIG. 3 has a receiving part 401, a self analyzing part 402, a comparing part 403, a reply start determine part 404 and a reply part 405.

The receiving part 401 receives a signal transmitted from the first radio communication apparatus, and extracts the identifier generated by the identifier generating part 202 of the first radio communication station, included in the received signal.

The self analyzing part 402 analyses a current state of the own station. For example, it is determined whether the own station is on moving.

The comparing part 403 compares the condition for determining a communication counterpart determined by the communication counterpart determining part of the first radio communication station and indicated by the identifier, and the current state of the own station obtained by the self analyzing part 402.

In the above-mentioned example, when the condition for determining a communication counterpart indicated by the identifier is "on moving", and also, the own station is on moving, a comparison result of the comparing part 403 is "agreement".

The reply start determining part 404 determines to reply when the comparison result of the comparing part 404 is "agreement".

The reply part 405 replies when the reply start determining part 404 determines to reply. When the comparison result of the comparing part 403 is not "agreement", the reply part 405 does not reply.

Thus, only any second radio communication stations each of which meets the condition determined by the communication counterpart determining part 201 of the first radio communication station reply. The other second radio communication stations do not reply. Accordingly, it is possible to effectively control the number of the second radio communication stations which reply.

FIG. 4 depicts a functional block diagram for illustrating another example of a function of the communication start determining part 400.

FIG. 4 is different from FIG. 3 in that a reply time determining part 406 is provided instead of the reply start determining part 404. The other part of FIG. 4 is the same as that of FIG. 3, the same reference numerals are given to the same functional parts, and duplicate descriptions are omitted.

In the example of FIG. 4, when a comparison result of the comparing part 403 is "agreement", the reply time determining part 406 determines to reply in a predetermined first time. When a comparison result of the comparing part 403 is not "agreement", the reply time determining part 406 determines to reply in a predetermined second time which is later than the predetermined first time.

In the example of FIG. 4, the second radio communication stations each of which meets the condition determined by the communication counterpart condition determining part 201 of the first radio communication station replies in the predetermined first time. The other second radio communication stations reply in the predetermined second time. Thus, depending on the current situations of the second radio communication stations or such, reply time of the second radio communication station can be made different from each other. Therefore, it is possible to effectively avoid data collision when the second radio communication stations reply.

FIG. 5 depicts a functional block diagram for illustrating another example of a function of the communication counterpart selecting part 200.

Different from the example of FIG. 2, a relationship to another station detecting part 204 and a communication counterpart determining part 205 are provided in the example of FIG. 5.

The relationship to another station detecting part 204 detects a relationship between each second radio communication station as a candidate for a communication counterpart and the own station.

Specifically, for example, a relative distance between each second radio communication station and the own station is measured with the use of a radar function or such. Further, at the same time, an apparatus ID of each second radio communication station is obtained via previous communication with the second radio communication station for which the measurement is carried out. Then, the relative distance is stored in association with the corresponding apparatus ID of each second radio communication station for which the measurement has been thus carried out.

Then, the communication counterpart determining part 205 determines a communication counterpart based on the detection result of the relationship to another station detecting part 204. The identifier generating part 202 generates an identifier indicating the apparatus ID of a communication counterpart selected as described below.

For example, the communication counterpart determining part 205 selects the second radio communication stations each of which has an approximately constant relative distance from the own station. In this case, the identifier generating part 202 generates an identifier indicating the apparatus ID of each second radio communication station which is stored in association with the corresponding distance measurement result. The transmitting part 203 then transmits the thus-generated identifier.

FIG. 6 depicts a block diagram of a further another example of a function of the communication start determining part 400, corresponding to the communication counterpart selecting part 200 in the example described above with reference to FIG. 5.

In this example, the identifier received by the receiving part 401 of the second radio communication station indicates the apparatus ID of the communication counterpart determined by the communication counterpart determining part 205 of the first radio communication station. The apparatus ID is then compared with the own apparatus ID by the comparing part 407.

The reply start determining part 404 determines that the reply part 405 is to reply when a comparison result of the comparing part 407 is "agreement". The reply start determining part 404 determines that the reply part 405 is not to reply when a comparison result of the comparing part 407 is not "agreement".

FIG. 7 depicts a block diagram of a further another example of a function of the communication start determining part 400, corresponding to the communication counterpart selecting part 200 in the example described above with reference to FIG. 5.

Also in this example, the identifier received by the receiving part 401 of the second radio communication station indicates the apparatus ID of the communication counterpart determined by the communication counterpart determining part 205 of the first radio communication station. The apparatus ID is then compared with the own apparatus ID by the comparing part 407.

In the case of FIG. 7, the reply time determining part 406 determines to reply in a predetermined first time when a comparison result of the comparing part 407 is "agreement". The reply time determining part 406 determines to reply in a predetermined second time which is later than the predetermined first time when a comparison result of the comparing part 407 is not "agreement".

Thus, in the examples of FIGS. 5, 6 and 7, the first radio communication station measures a relative relationship to each second radio communication stations, determines a communication counterpart under the condition that the communication counterpart has a predetermined relationship with the own station, and transmits an identifier of an apparatus ID of the thus-determined communication counterpart. The second radio communication stations having the apparatus ID the same as the apparatus ID indicated by the thus-transmitted identifier reply (in the example of FIG. 6), or the second radio communication station having the apparatus ID the same as the apparatus ID indicated by the thus-transmitted identifier reply in a relatively earlier reply time, i.e., the predetermined first time (in the example of FIG. 7).

As a result, it is possible to effectively avoid data collision otherwise occurring in reply.

In the examples of FIGS. 2, 3 and 4, the condition for determining a communication counterpart is not limited to whether a station is on "moving". For example, communication experiences may be used as the condition for determining a communication counterpart instead. That is, for example, the communication counterpart condition determining part 201 of the first radio communication station may determine such a condition that "the number of times of communication experiences with the first radio communication station is equal to or more than a predetermined number", the identifier generating part 202 may generate an identifier indicating the determined condition, and the transmitting part 203 may transmit the generated identifier.

In this case, the self analyzing part 402 of each second radio communication station checks data of communication experiences of the own station with the first radio communication station. The comparing part 403 then compares the above-mentioned condition "the number of times of communication experiences with the first radio communication station is equal to or more than a predetermined number" indicated by the identifier received by the receiving part 401 with the data of communication experiences of the own station with the first radio communication station which has been checked by the self analyzing part 402. When a comparison result is "agreement", that is, when the condition "the number of times of communication experiences with the first radio communication station is equal to or more than a predetermined number" is met by the data of communication experiences of the own station with the first radio communication station, the reply start determining part 404 causes the reply part 405 to reply. When the comparison result is not "agreement", that is, when the condition "the number of times of communication experiences with the first radio communication station is equal to or more than a predetermined number" is not met by the data of communication experiences of the own station with the first radio communication station, the reply start determining part 404 does not cause the reply part 405 to reply (in the example of FIG. 3). Alternatively, when the comparison result is "agreement", the reply time determining part 406 may cause the reply part 405 to reply in a predetermined first time. When the comparison result is not "agreement", the reply time determining part 406 may cause the reply part 405 to reply in a predetermined second time which is later than the predetermined first time (in the example of FIG. 4).

It is noted that, in the example of FIGS. 2, 3 and 4, as the above-mentioned condition for determining a communication counterpart, in addition to the above-mentioned condition of whether a station is on moving, another condition such as the above-mentioned "communication experiences" may also be used together in a combining manner, to further reducing the number of the second radio communication stations which reply.

That is, the number of the second radio communication stations, the number of which has been already reduced by a first condition of whether a station is on moving, is further reduced by a second condition of whether a station has communication experiences, or such. Thus, only the second radio communication stations, each of which meets a combination of these conditions, that is, a new condition obtained from logical AND operation of the first and second conditions, may reply.

Further, in a case where the plurality of conditions are used as mentioned above, any second radio communication stations each of which meets a first condition are determined to actually reply, and then, whether each of the second radio communication stations is to reply in a predetermined first time or a predetermined second time which is later than the predetermined first time may be determined from determination as to whether a second condition is met by each of the second radio communication stations.

The embodiments will now be described more specifically with reference to figures.

The embodiments relate to communication systems, and in particular, to access methods between mobile radio stations, in which a master station transmits a SEND packet, a second master station or a slave station having received the SEND packet then reply thereto with an ACK packet, and thus, communication is carried out therebetween.

In this case, the above-mentioned SEND packet is used to transmit information for limiting the number of second radio communication stations (which may be simply referred to as second stations), i.e., an access control identifier, such that only second stations each of which meets the information reply. Thus, the number of second stations which reply is limited when a plurality of second stations exit, and thus, data collision can be avoided or reduced.

Further, by thus limiting the number of second stations which reply, it is possible to reduce data collision without giving reply order data to each mobile station as discussed in the Patent Document 1, even in a case where a situation of a master station always change because the master station is a mobile station, and thus, IDs (i.e., apparatus identifiers) of possible second stations may not be known.

Further, when a first radio communication station (which may be simply referred to as a first station) receives a SEND packet or an ACK packet from a second station, the first station may store a transmission source ID (apparatus identifier) included in the packet, and may attach the transmission source ID to a SEND packet when transmitting the SEND packet. In this case, a configuration may be provided such that, the second station of the transmission source ID replies with an ACK packet in a predetermined receiving time (corresponding to the above-mentioned reply time) which is allocated specially by the first station for the second station. Thereby, it is possible to carry out communication between the first and second stations without data collision with another second station.

Thus, in the embodiments, even in a case where may second stations exist within a certain area, it is possible to control the number of the second stations which reply, with the use of the above-mentioned access control identifier. Thereby, it is possible to avoid or reduce data collision otherwise occurring when reply is carried out.

Further, in a case where apparatus identifiers of neighbor second stations are not known, it is not possible to give reply order data of the Patent Document 1 to each mobile station. In contrast thereto, according to the embodiments, even in such a case, it is possible to avoid or reduce data collision by applying the access control identifier.

Further, by limiting the number of stations which reply, as a result of transmitting a transmission source ID (apparatus identifier) to be attached to a SEND packet, which is included in a SEND packet or an ACK packet received from a second station, it is possible to carry out communication without data collision with another second station.

That is, according to the embodiments, in communication between mobile radio stations in which, a master station sends a SEND packet, and a second master station or a slave station having received the SEND packet replies with an ACK packet, the master station transmits the SEND packet including an access control identifier which indicates a condition for limiting the number of second stations which reply, by a type of a second station or a moving state of the second station. Then, the second master station or the slave station having received the SEND packet compares the own state with the condition indicated by the access control identifier, and transmits an ACK packet only when the own state meets the given condition as a result of the comparison. As a result, in a situation in which a plurality of second stations exist in the neighborhood, it is possible to limit the number of second stations which reply to the SEND packet and to avoid or reduce data collision.

Further, a master station may transmit a SEND packet including an access control identifier indicating a condition such that any second stations having communication experiences to the master station within a predetermined prior time interval are to reply, a second master station or a slave station recognizes the access control identifier and checks communication experiences between the own station and the master station, and may transmit an ACK packet when determining that the communication experiences with the master station exist within the predetermined prior time interval. As a result, it is possible to carry out communication preferentially with second stations having communication experiences.

Further, a master station which has sent a SEND packet may indicate a plurality of ACK packet receiving times (each of which corresponds to the above-mentioned reply time) which are predetermined by transmitting time and a packet length of the SEND packet. Thus, it is possible to allocate a response of the second station having a designated apparatus identifier included in the SEND packet to a first ACK packet receiving time, and allocate responses of the other second stations to ACK packet receiving times starting from a second ACK packet receiving time. In this case, the second station, which may be a second master station or a slave station, which has received the SEND packet, compares the own identifier with the designated apparatus identifier included in the SEND packet, and transmits an ACK packet in the first ACK packet receiving time allocated by the master station when a comparison result is "agreement". The other second station, which may be the second master station or the slave station, which has received the SEND packet, transmits an ACK packet in any one of the ACK packet receiving times starting from the second ACK packet receiving times allocated by the master station, when the comparison result is not "agreement". Thereby, it is possible to avoid collision between data coming from the specific second station having the designated apparatus identifier and data coming from the other second stations.

Alternatively, a second master station or a slave station having received a SEND packet may change an ACK packet transmitting time according to communication experiences, and thus, communication with a plurality of second stations may be carried out in an order such that a second station having a larger number of communication experiences may be given higher priority to reply.

Further, a mobile radio station, as a first station, may have a radar function for detecting a distance to a target, a direction of the target and a moving speed of the target by transmitting radar waves and receiving radar waves retuned from the target. In such a case, a master station, as a first station, may obtain a distance to a second station and a speed of the second station, and compares them with information concerning the own station. Then, when it is determined from the comparison that a relative distance is approximately constant, and a relative speed is approximately zero, it may be estimated that the second station may follow the master station or the second station may move side by side with the master station. In such a case, the master station may set an apparatus identifier of the corresponding second station as a designated apparatus identifier, and transmits a SEND packet. Only the second station thus designated transmits an ACK packet in a first ACK packet receiving time allocated by the master station. As a result, it is possible to avoid collision between data coming from the second station which follows to the master station or moves side by side with the master station and data coming from another second station, and it is possible to communicate with the second station which follows to the master station or moves side by side with the master station preferentially.

Below, a specific situation example of each embodiment will be described with reference to figures.

Embodiment 1

Figure 8A:
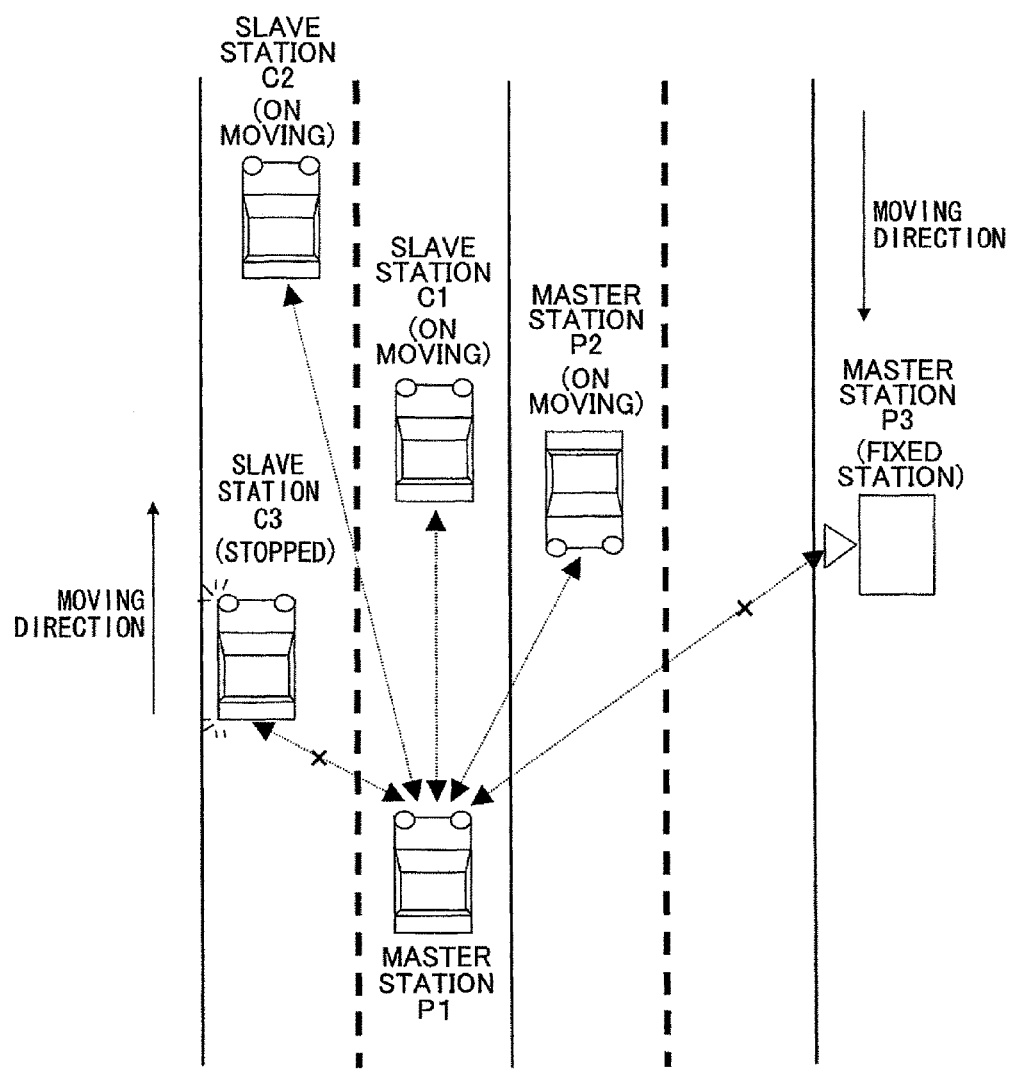
FIG. 8A illustrates a situation of a communication system in an embodiment 1.

FIG. 8A depicts a situation of a communication system in an embodiment 1, and FIG. 8B depicts a time chart of the situation.

It is noted that, in each embodiment described below, in communication between automobiles or vehicles which run on a road, each automobile or vehicle has both a master station mounted at a front position and a slave station mounted at a rear position. Further, a fixed master station P3 is installed at the roadside.

As a result, in each automobile or vehicle, a master station operates with respect to a master or slave station of another automobile or vehicle which exists on the front side, and a slave station operates with respect to a master or slave station of another automobile or vehicle which exists on the rear side. As a result, a master station of each automobile or vehicle acts as a first station which transmits a SEND packet to a master or slave station of a second automobile or vehicle which exists on the front side, and also, acts as a second station which receives a SEND packet and if necessary transmits an ACK packet with respect to the master or slave station of the second automobile or vehicle which exists on the front side. On the other hand, a slave station of each automobile or vehicle only acts as a second station which receives a SEND packet and if necessary transmits an ACK packet with respect to a master or slave station of a second automobile or vehicle which exists on the rear side. It is noted that, in FIGS. 8A, 9A, 10A, 11A and 13A, which depict situations of respective embodiments, for the sake of simplicity, only first and second stations which operate in the corresponding situations are depicted.

In the embodiment 1 of FIGS. 8A and 8B, an access control identifier indicates, as a condition for determining a communication counterpart, for example, any one of "A: a mobile station and is on moving", "B: a mobile station and is stopped", and "C: a fixed station".

The access control identifier is included in a SEND packet transmitted from a master station P1. Each second station having received the SEND packet compares the condition for determining a communication counterpart indicated by the access control identifier with a situation of the own station, and replies with an ACK packet when a compression result is that the condition is met (FIG. 8B).

In the example of FIGS. 8A and 8B, the access control identifier included in the SEND packet indicates, as the condition for determining a communication counterpart, "A: a mobile station and is on moving". Accordingly, as second stations, each of a master station P2, a slave station C1 and a slave station C2 meets the condition, and thus, sends an ACK packet. On the other hand, each of a master station P3 and a slave station C3 does not meet the condition, and thus, does not send an ACK packet. This is because the master station P3 is a fixed station and thus is not a mobile station, and the slave station C3 is stopped and thus is not on moving.

It is noted that the above-mentioned access control identifier is one example. Other than this example, it is possible to designate various conditions for determining a communication counterpart. For example, the following conditions may be used as the condition for determining a communication counterpart. That is, "whether a second station is a master station or a slave station (i.e., a type of a station)", "whether a second station is a master station or a slave station, and also, whether the second station is a mobile station or a fixed station", or "whether a second station has communication experiences within a predetermined prior time interval", as in the embodiment 2 described later, or such, may be used as the condition for determining a communication counterpart.

Embodiment 2

Figure 9A:
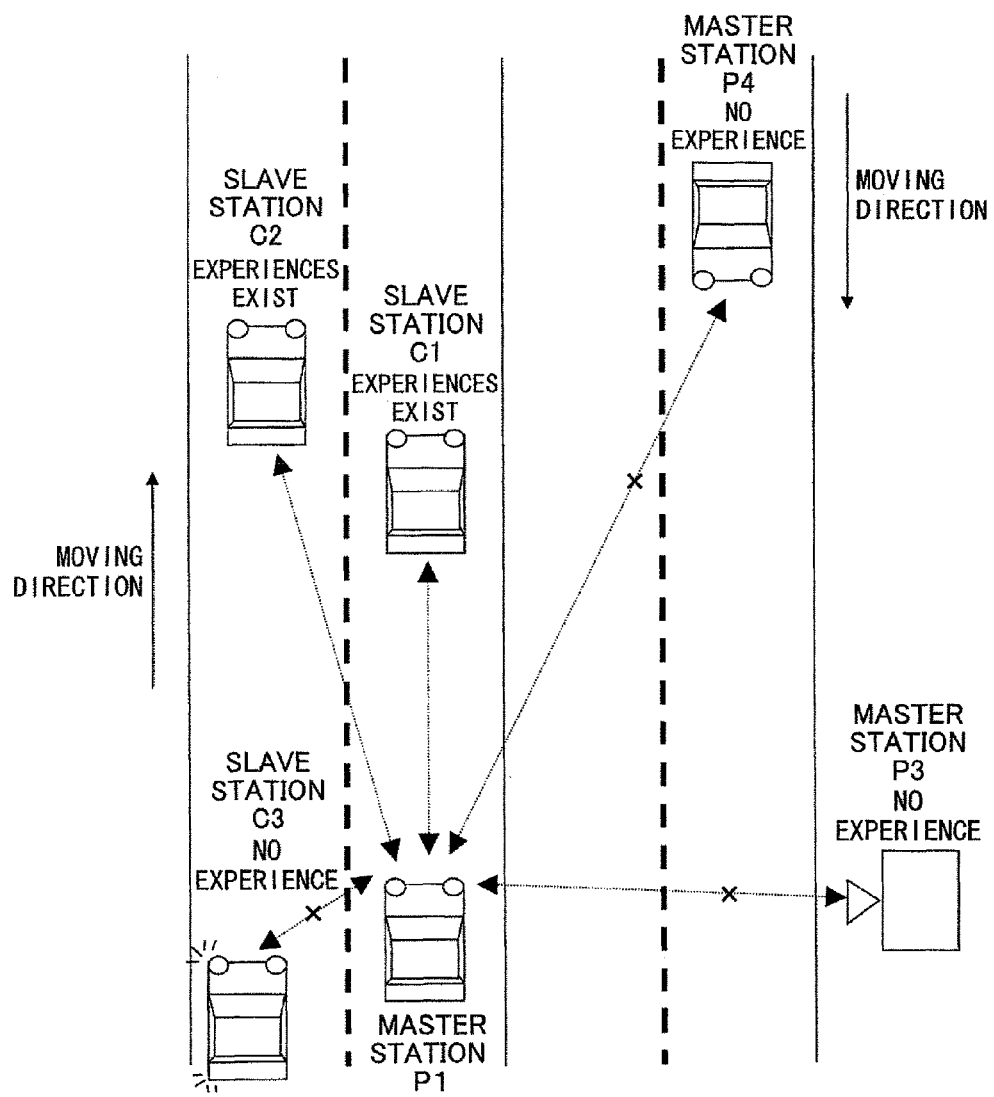
FIG. 9A illustrates a situation of a communication system in an embodiment 2.

FIG. 9A depicts a situation in a communication system in the embodiment 2, and FIG. 9B depicts a time chart of the situation.

Here, a certain time has elapsed from the situation depicted in FIG. 8A.

Figure 20:
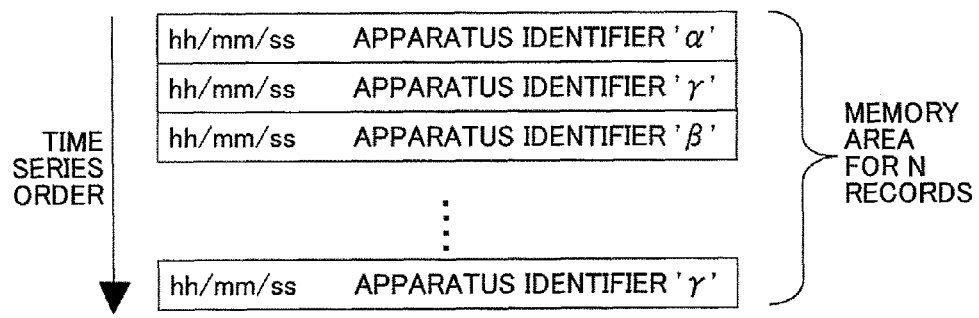
FIG. 20 illustrates one example of a stored state of communication experiences in the communication system in each embodiment.

In this case, each of master stations and slave stations has a RAM mounted inside, and therewith, can store communication experiences from the current time to a time which is prior to the current time by a predetermined prior time interval (see FIG. 20).

Also in this example, a SEND packet transmitted from a master station P1 includes an access control identifier. Then, when the access control identifier designates "a second station has communication experiences", each second station checks communication experiences stored in the RAM, and replies with an ACK packet when having communication experiences with the master station P1 for the predetermined prior time interval. Thus, the master station P1 which transmits the SEND packet can communicate preferentially with any second stations with each of which the master station P1 has communication experiences for the predetermined prior time interval.

In the example of FIGS. 9A and 9B, the master station P2, the slave station C1 and the slave station C2 transmitted ACK packets as depicted in FIG. 8B, and thus, have communication experiences with the master station P1. Then, thereamong, the slave stations C1 and C2 exist within such a range with respect to the master station P1 that the slave stations C1 and C2 can respond to the SEND packets, in the current situation. Therefore, the slave stations C1 and C2 reply with ACK packets (as depicted in FIG. 9B).

Embodiment 3

Figure 10A:
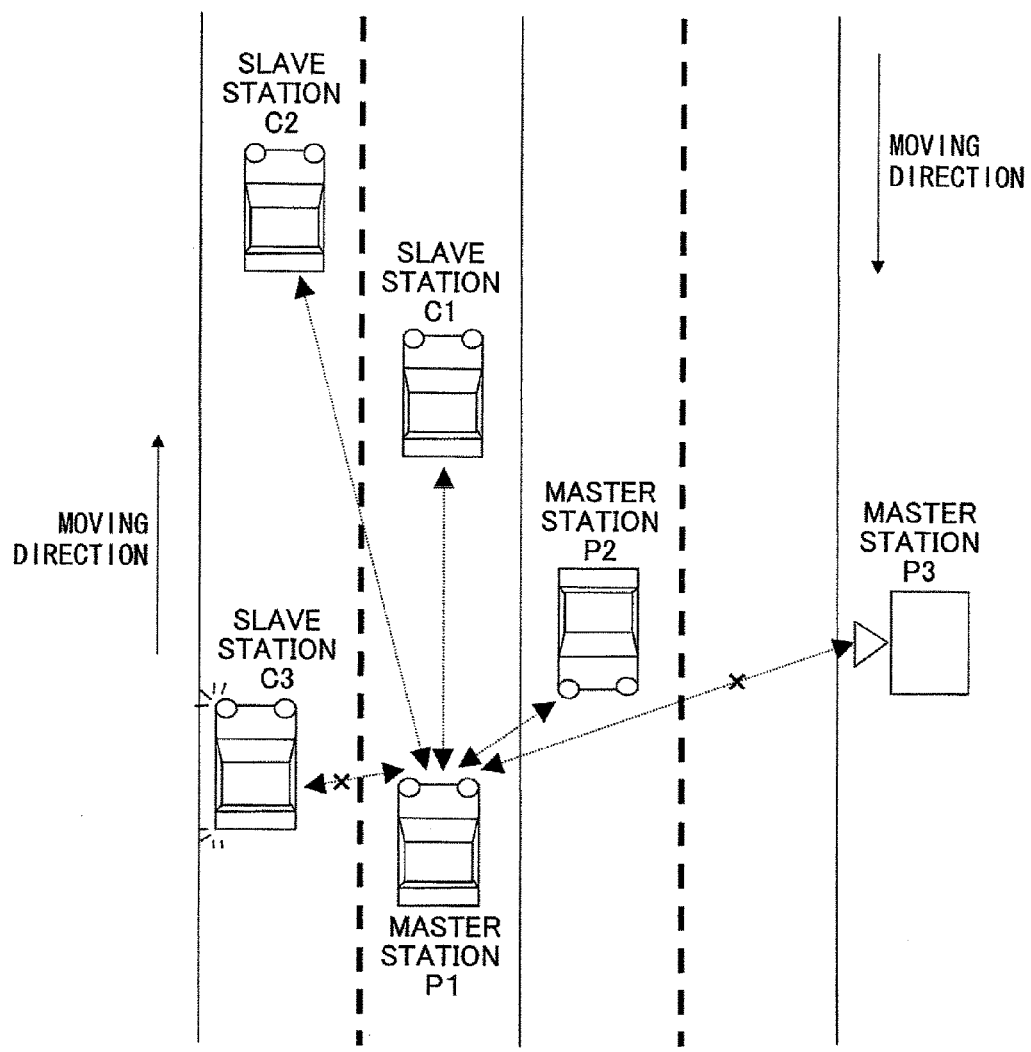
FIG. 10B depicts a time chart for illustrating the communication system in the embodiment 3.
Figure 10B:
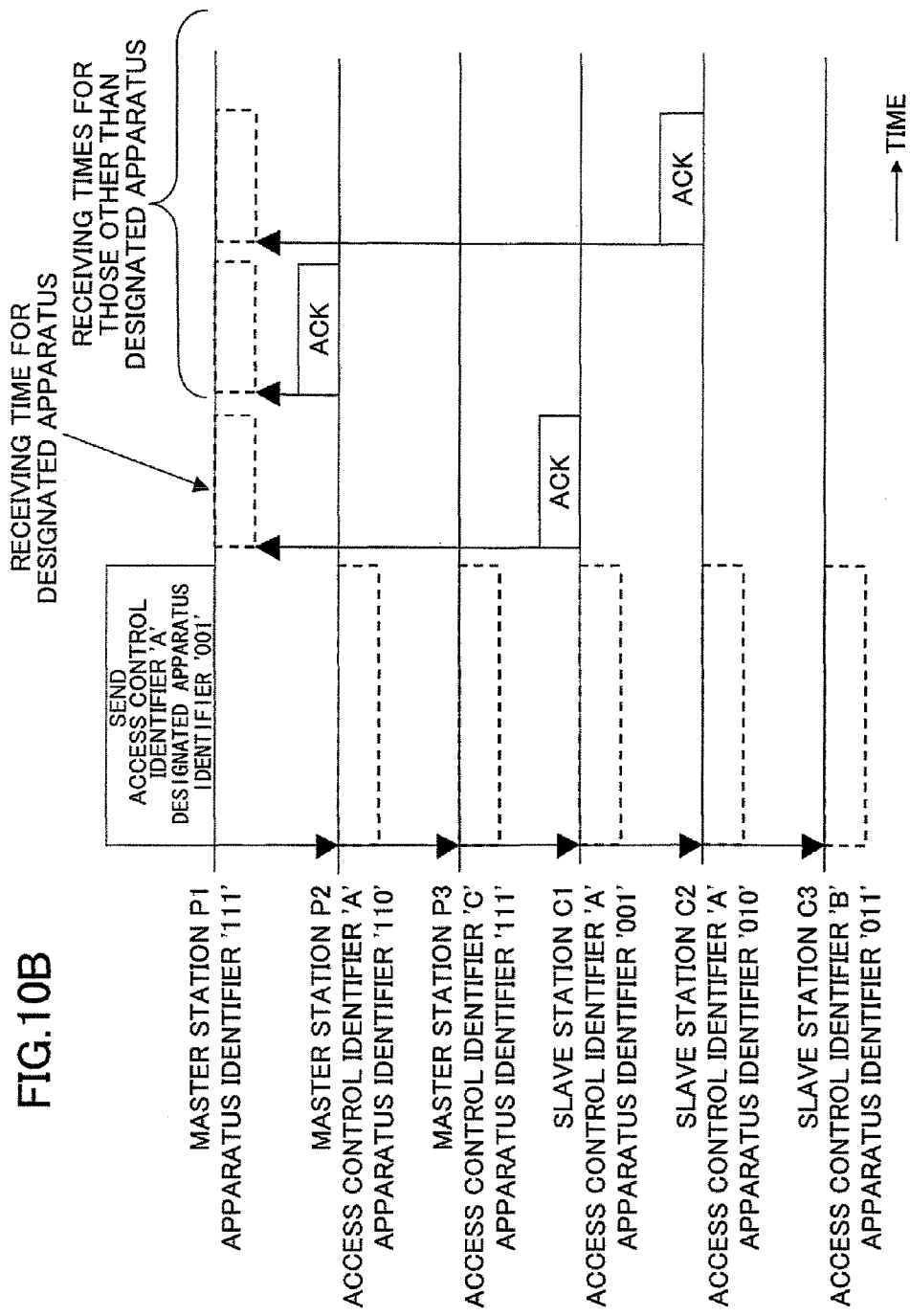

FIG. 10A depicts a situation in a communication system in an embodiment 3, and FIG. 10B depicts a time chart of the situation.

In this case, each master station has a RAM, and can store communication experiences from the current time to a past time a predetermined prior time interval prior to the current time (see FIG. 20). Further, each master station, as a first station, can determine a specific second station based on the communication experiences, and transmit a SEND packet designating an apparatus identifier of the specific second station.

In a SEND packet transmitted from a master station P1, a designated apparatus identifier is included in addition to an access control identifier. Each second station having received the SEND packet compares an apparatus identifier of its own with the designated apparatus identifier included in the SEND packet. The second station replies with an ACK packet in a first ACK packet receiving time (i.e., a receiving time for designated apparatus), when a comparison result is "agreement". On the other hand, the second station replies with an ACK packet in any one of ACK packet receiving times starting from a second ACK packet receiving time (i.e., receiving times for those other than designated apparatus), when the comprising result is not "agreement", but the own station meets a condition designated by the access control identifier included in the SEND packet. Thereby, the packet from the specific second station doe not collides with a packet from any other second stations, and the first station can positively communicate with the specific second station.

In the case of FIGS. 10A and 10B, the slave station C1 which has the apparatus identifier designated by the SEND packet transmitted from the master station P1 replies with an ACK packet in the first ACK packet receiving time. The master station P2 and the slave station C2 each of which does not has the designated apparatus identifier but meets the condition designated by the access control identifier reply with ACK packets in ACK packet receiving times starting from the second ACK packet receiving time. This is because each of the master station P2 and the slave stations C1 and C2 meets the condition "A: a mobile station and is on moving" designated by the access control identifier included in the SEND packet depicted in FIG. 10B, and only the slave station C1 has an apparatus identifier 001 designated by the designated apparatus identifier included in the SEND packet.

Embodiment 4

Figure 11A:
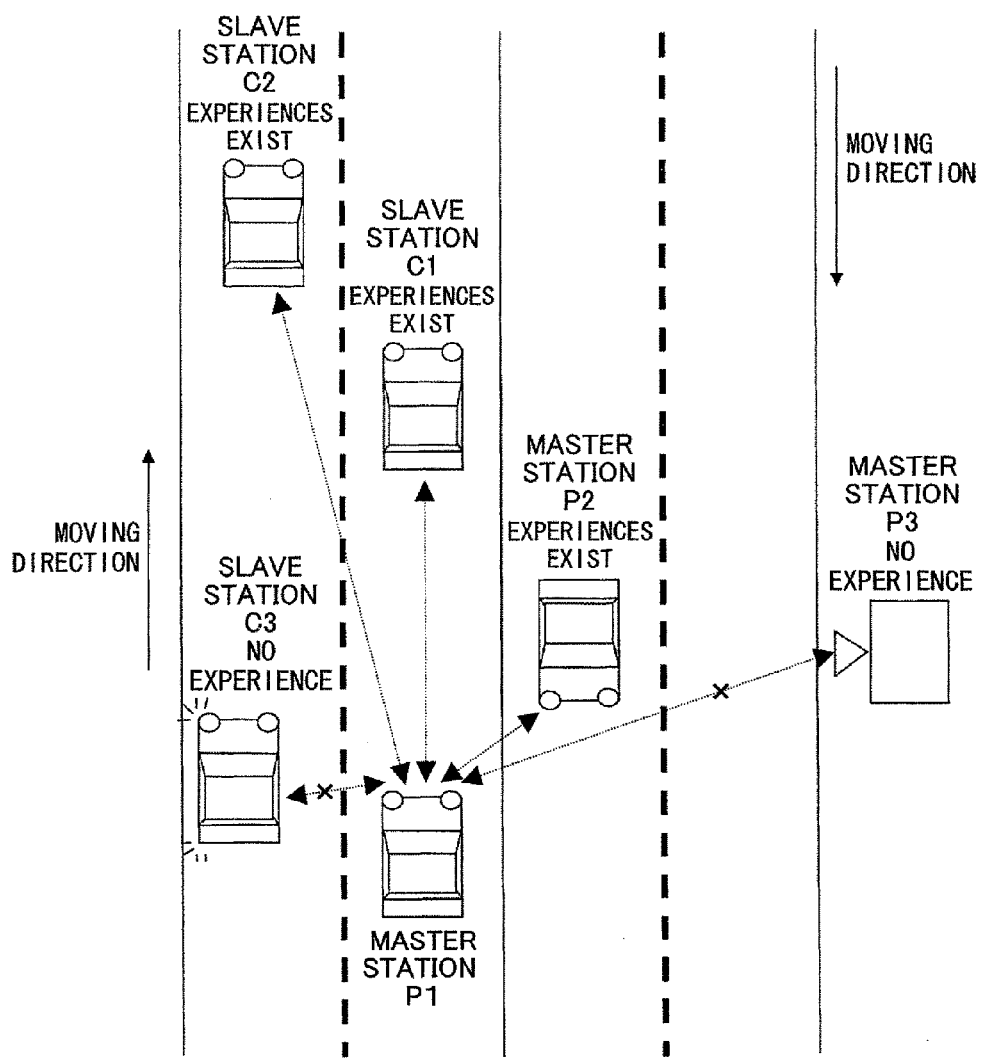
FIG. 11A illustrates a situation of a communication system in an embodiment 3.

FIG. 11A depicts a situation in a communication system in an embodiment 4, and FIG. 11B depicts a time chart of the situation.

Also in this case, each of master stations and slave stations has a RAM, and can store communication experiences from the current time to a time a predetermined prior time interval prior to the current time (see FIG. 20).

In a SEND packet transmitted from a master station P1, an access control identifier is included, which designates "a station has communication experiences (according to an order of the number of times)". Each second station having received the SEND packet checks communication experiences stored in the RAM. Any second stations having communication experiences with the master station P1 determine reply times according to their numbers of times of the communication experiences (described later with reference to FIG. 23), and reply with ACK packets in the determined reply times. As a result, the master station P1 can communicate with the second stations preferentially according to an order of the numbers of times of communication experiences.

In the example of FIGS. 11A and 11B, the slave station C1 has the largest number of communication experiences with the master station P1, the slave station C2 has the second largest number of communication experiences with the master station P1, and the master station P2 has a single communication experience with the master station P1. Then, the slave stations C1, C2 and the master station P2 reply with ACK packets in the stated order.

Embodiment 5

Figure 13A:
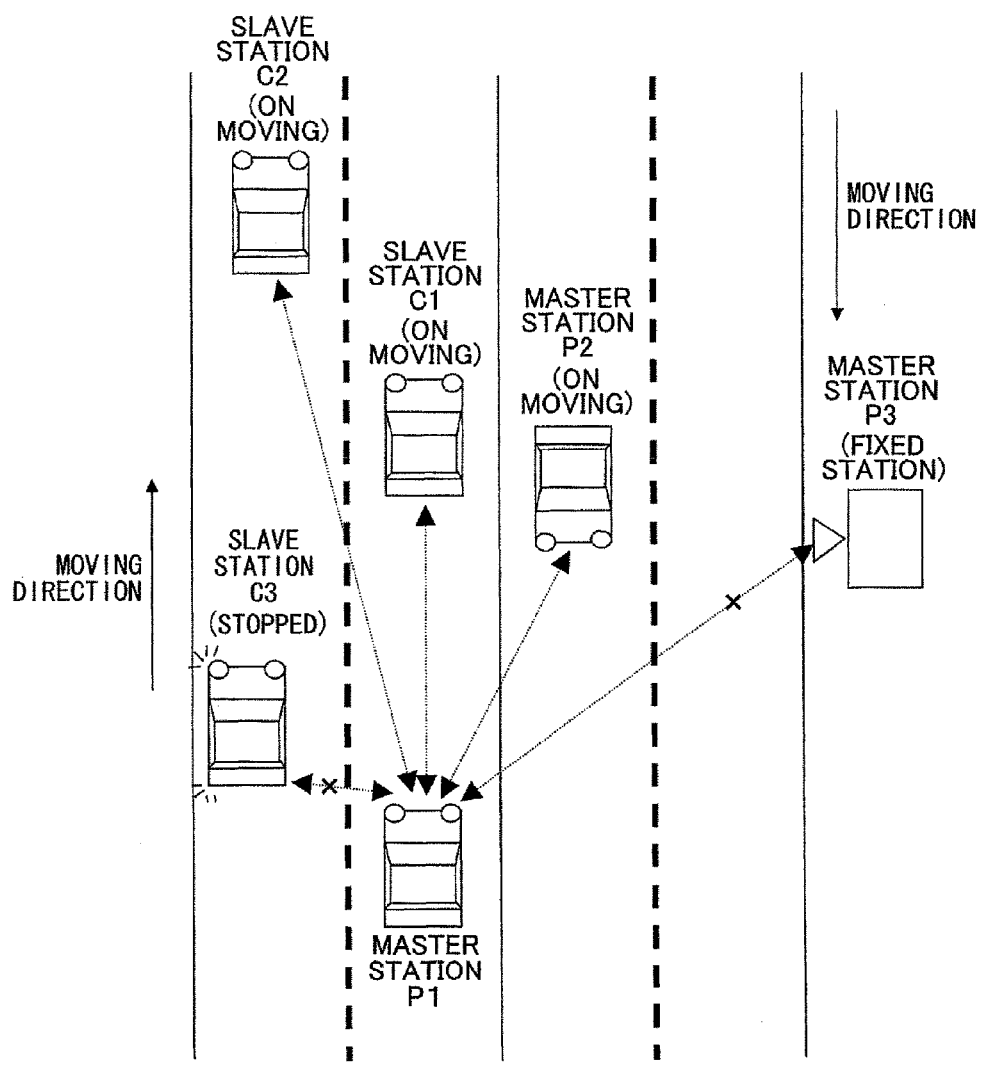
FIG. 13A illustrates a situation of a communication system in the embodiment 5.

FIGS. 12A, 12B depict information obtained from a radar function, in an embodiment 5. FIG. 12A depicts a result of time T1, and FIG. 12B depicts a result of time T2 after the time T1. FIG. 13A depicts a situation in a communication system in the embodiment 5, and FIG. 13B depicts a time chart in the situation.

In the embodiment 5, each mobile radio station, as a first station, has a radar function of detecting a distance to, a direction of and a moving speed of a second station by transmitting radar waves and receiving radar waves retuning from the second station, in addition to the communication function of each radio communication station in the communication system of the embodiment 1.

A master station P1 operates the radar function at the time T1 and time T2, and obtains the information depicted in FIGS. 12A and 12B, for example.

With reference to FIGS. 12A and 12B, it is seen that, the master station P1 approaches the master station P2 and the slave station C2, at respective relative speeds. In contrast thereto, with respect to the slave station C1, a relative distance of the master station P1 is fixed, and a relative speed is zero. Therefore, it can be estimated that the slave station C1 may run with the master station P1 side by side or may follow the master station P1.

In such a case, the master station P1 determines that the slave station C1 exists always at such a position near to the master station P1 that the master station P1 can always communicate with the slave station C1. Then, the master station P1 transmits a SEND packet in which an apparatus identifier of the slave station C1 is set as a designated apparatus identifier.

Each second station having received the SEND packet compares an apparatus identifier of its own with the designated apparatus identifier included in the SEND packet. The second station having the same apparatus identifier, i.e., the slave station C1, replies with an ACK packet in a first ACK packet receiving time (i.e., a receiving time for the designated apparatus identifier).

On the other hand, any second stations not having the same apparatus identifier but meeting the condition designated by the access control identifier reply with ACK packets in times starting from the second ACK packet receiving time (i.e., receiving times not for the designated apparatus identifier).

Thereby, the master station P1 can communicate with the specific second station (slave station C1) while a packet from the specific second station does not collides with a packet from any other second stations.

Figure 14:
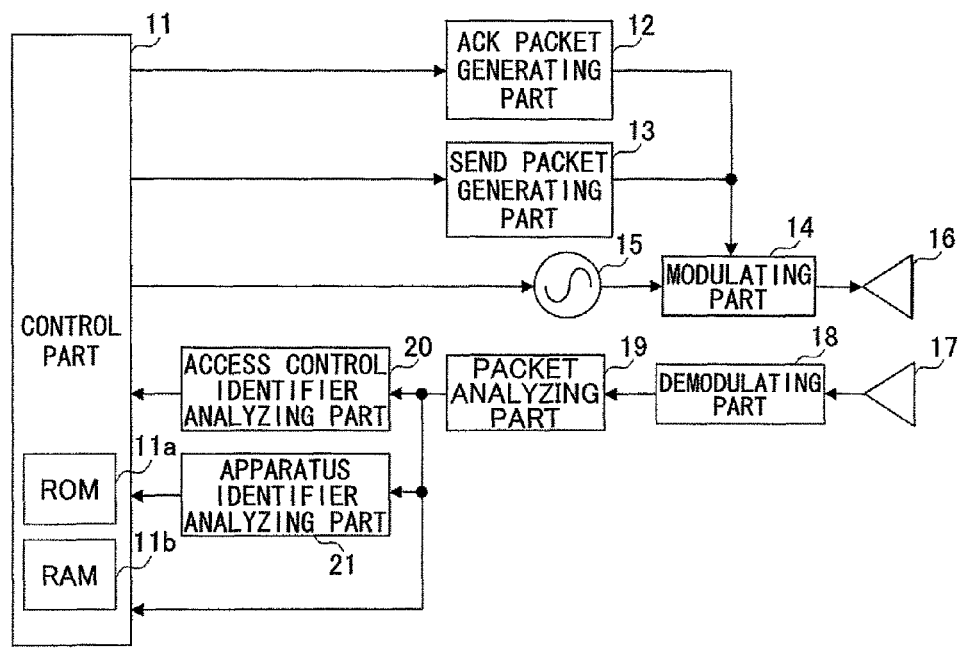
FIG. 14 depicts a block diagram for illustrating a basic configuration example of each master station in the communication system in each embodiment.

FIG. 14 depicts a block diagram of a basic configuration example of each master station in each embodiment mentioned above.

The master station includes a control part 11, an ACK packet generating part 12, a SEND packet generating part 13, a modulating part 14, an oscillator 15, a transmission antenna 16, a reception antenna 17, a demodulating part 18, a packet analyzing part 19, an access control identifier analyzing part 20 and an apparatus identifier allaying part 21.

The control part 11 includes, in addition to a CPU, a ROM 11a and a RAM 11b for storing programs and data such as an apparatus identifier of a transmission source and an apparatus identifier of the own station, has a function of designating an access control identifier, a transmission destination apparatus identifier, a transmitting time, and so forth, selecting whether a packet to transmit is to be a SEND packet or an ACK packet, and determining whether a packet should be transmitted.

The ACK packet generating part 12 generates an ACK packet and includes therein a transmission destination apparatus identifier, the apparatus identifier of the own station, transmitting data and so forth, having been transmitted from the control part 11.

The SEND packet generating part 13 generates a SEND packet and includes therein an access control identifier, a transmission destination apparatus identifier, the apparatus identifier of the own station, transmitting data and so forth, having been transmitted from the control part 11.

The oscillator 15 generates carrier waves for transmitting thus-generated packets.

The modulating part 14 modulates the carrier waves with data of the packets, and sends the modulated waves to the antenna 16.

A specific modulation method used by the modulating part 14 may be any method such as AM modulation, FM modulation or PSK modulation.

The demodulating part 18 demodulates packet data from a signal received via the antenna 17, and sends the packet data to the packet analyzing part 19.

A specific demodulation method used in the demodulating part 18 corresponds to the modulation method used in the modulating part 14.

The packet analyzing part 19 analyzes to determine whether a received packet is a SEND packet or an ACK packet, divides the packet into an access control identifier, an apparatus identifier, data and so forth, and sends them.

The access control identifier analyzing part 20 compares a condition indicated by an access control identifier included in a received SEND packet with a situation of the own station, when the received packet is the SEND packet, and sends a comparison result to the control part 11.

The control part 11 carries out control to transmit an ACK packet when the comparison result is "agreement".

The apparatus identifier analyzing part 21 compares a designated apparatus identifier included in a received SEND packet with the apparatus identifier of the own station when the received packet is the SEND packet, and sends a comparison result to the control part 11.

The control part 11 determines a transmitting time of an ACK packet for reply in such a manner that the ACK packet is to be transmitted in a first ACK packet receiving time allocated by a transmission station when the comparison result is "agreement", and the ACK packet is to be transmitted in any ACK packet receiving times starting from a second ACK packet receiving time allocated by the transmission station.

By configuring the master station as described above, the master station can change an ACK packet transmitting time when receiving a SEND packet, so that, it is possible to avoid collision of ACK packets to the utmost.

Further, the master station may temporarily act as a slave station.

Figure 15:
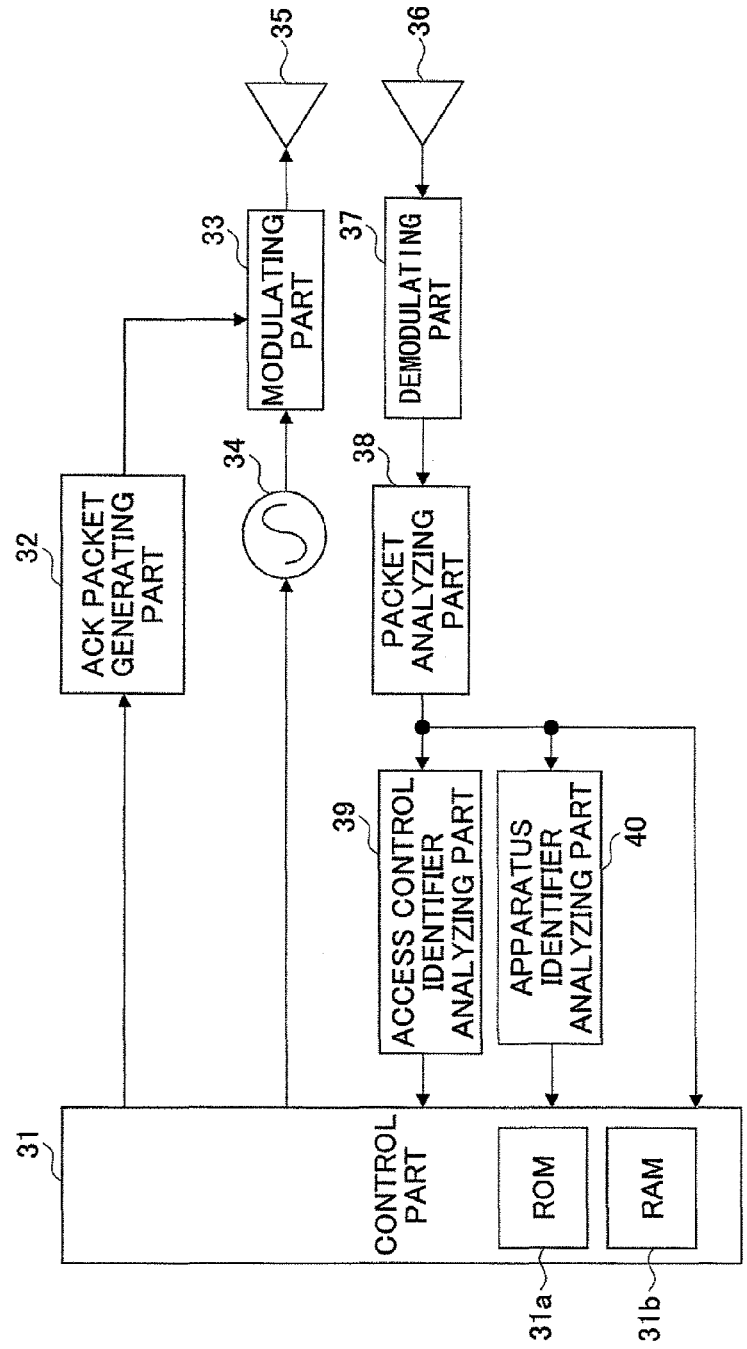
FIG. 15 depicts a block diagram for illustrating a basic configuration example of each slave station in the communication system in each embodiment.

FIG. 15 depicts a block diagram of a basic configuration example of each slave station in each embodiment mentioned above.

The slave station includes a control part 31, an ACK packet generating part 32, an oscillator 34, a modulating part 33, a transmission antenna 35, a reception antenna 36, a demodulating part 37, a packet analyzing part 38, an access control identifier analyzing part 39 and an apparatus identifier analyzing part 40.

The control part 31 includes, in addition to a CPU (not depicted), and a ROM 31a and a RAM 31b for storing programs, data such as a transmission source apparatus identifier, an apparatus identifier of the own station and so forth, and has a function of determining whether to transmit an ACK packet, and designating a transmitting time of the ACK packet.

The ACK packet generating part 32 generates an ACK packet and includes therein a transmission destination apparatus identifier, the apparatus identifier of the own station, transmitting data and so forth.

The oscillator 34 generates carrier waves for transmitting the thus-generated packet.

The modulating part 33 modulates the carrier waves with data of the packet, and sends the modulated waves to the antenna 35. A specific modulation method used may be any method such as AM modulation, FM modulation, PSK modulation or such.

The demodulating part 37 demodulates packet data from a signal received via the antenna 36, and sends the packet data to the packet analyzing part 38. A specific demodulation method corresponds to the modulation method.

The packet analyzing part 38 analyzes to determine whether a received packet is a SEND packet or an ACK packet, divides the packet into an access control identifier, an apparatus identifier, data and so forth, and sends them.

The access control identifier analyzing part 39 compares a condition indicated by an access control identifier included in a received SEND packet with the apparatus identifier of the own station when the received packet is the SEND packet, and sends a comparison result to the control part 31. The control part 31 carries out control to transmit an ACK packet when the comparison result is "agreement".

The apparatus identifier analyzing part 40 compares a designated apparatus identifier included in a received SEND packet with the apparatus identifier of the own station when the received packet is the SEND packet, and sends a comparison result to the control part 31.

The control part 31 determines a transmitting time for replying with an ACK packet in such a manner that, when the comparison result is "agreement", the ACK packet is to be transmitted in a first ACK packet receiving time allocated by a transmission station, and when the comparison result is not "agreement", the ACK packet is to be transmitted in any ACK packet receiving time of those starting from a second ACK packet receiving time allocated by the transmission station.

Figure 16:
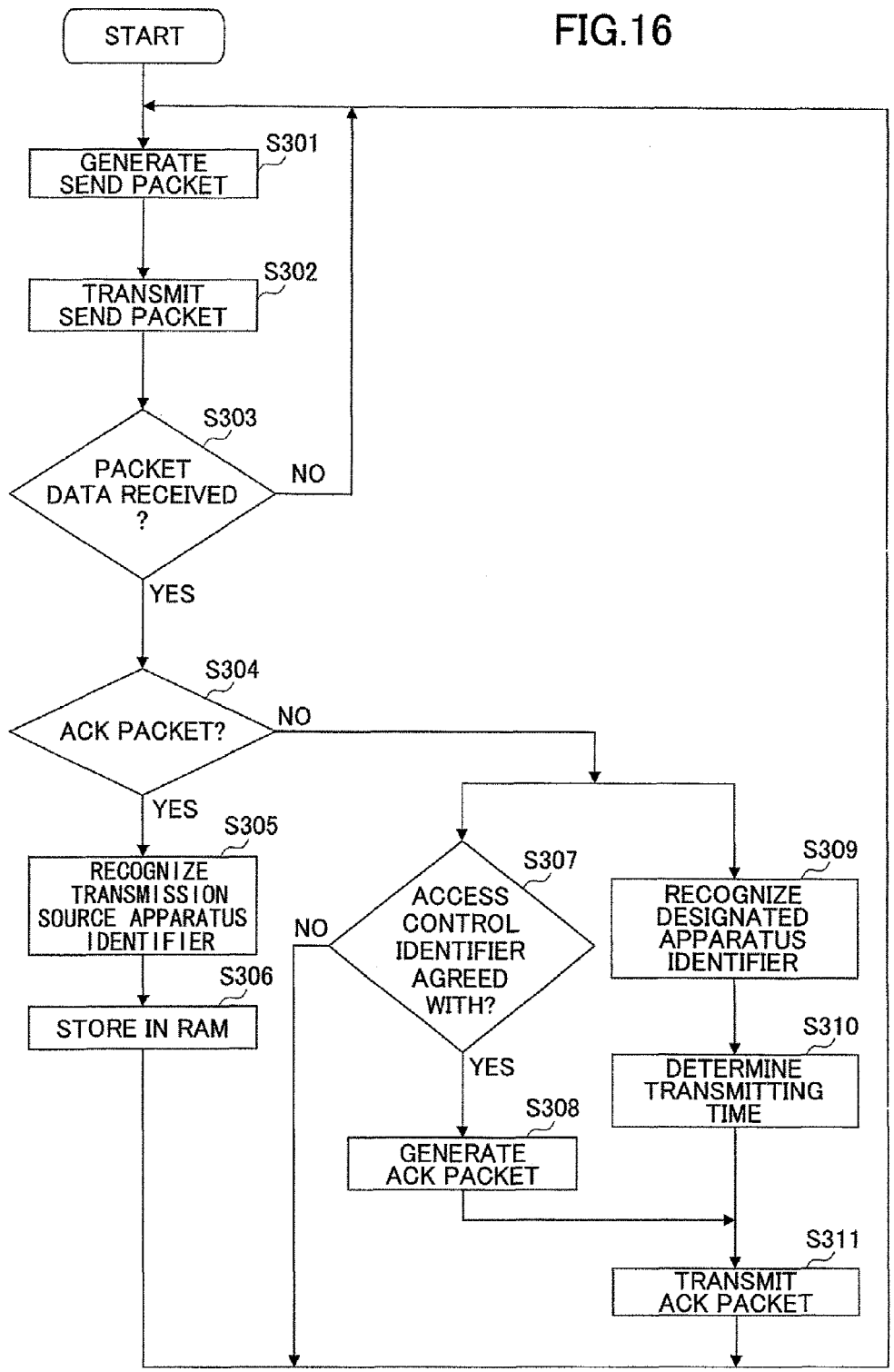
FIG. 16 depicts a flow chart for illustrating basic operation configuration example of each master station in the communication system in each embodiment.

FIG. 16 depicts an operation flow chart of operation of the master station configured as described above with reference to FIG. 14.

In step S301, the master station generates a SEND packet including a designated apparatus identifier, the apparatus identifier of its own, an access control identifier, data or such, having been transmitted from the control part 11, and transmits the SEND packet in step S302.

When receiving a signal in step S303, the master station determines whether the signal is packet data. When the signal is not packet data (NO in step S303), step S301 is returned to.

When the signal is packet data (YES in step S303), the master station determines in step S304 whether the packet data is of an ACK packet. When the packet data is not of an ACK packet (NO in step S304), this means that the packet data is of a SEND packet, and the master station carries out two series of operation, i.e., a series of operation starting from step S307 and another series of operation starting from step S309.

On the other hand, when the packet data is of an ACK packet (YES in step S304), the master station recognizes an apparatus identifier of a transmission source of the packet in step S305, and sends the apparatus identifier to the RAM 11b of the control part 11 in step S306.

In step S307, the master station determines whether a condition indicated by an access control identifier of the received packet (SEND packet) is met by a situation of the own station. When the condition is not met (NO in step S307), the master station recognizes that reply by the own station is not required, and returns to step S301.

In step S307, when the condition indicated by an access control identifier of the received packet (SEND packet) is met by the situation of the own station (YES in step S307), the master station recognizes that reply by the own station is required, and therefore, generates an ACK packet in step S308.

In step S309, the master station recognizes a designated apparatus identifier of the received packet (SEND packet), compares it with the own apparatus identifier, and determines, based on a comparison result, a time to transmit the ACK packet in step S310.

In step S311, the master station transmits the ACK packet generated in step S308 in a time determined in step S310, and returns to step S301.

Figure 17:
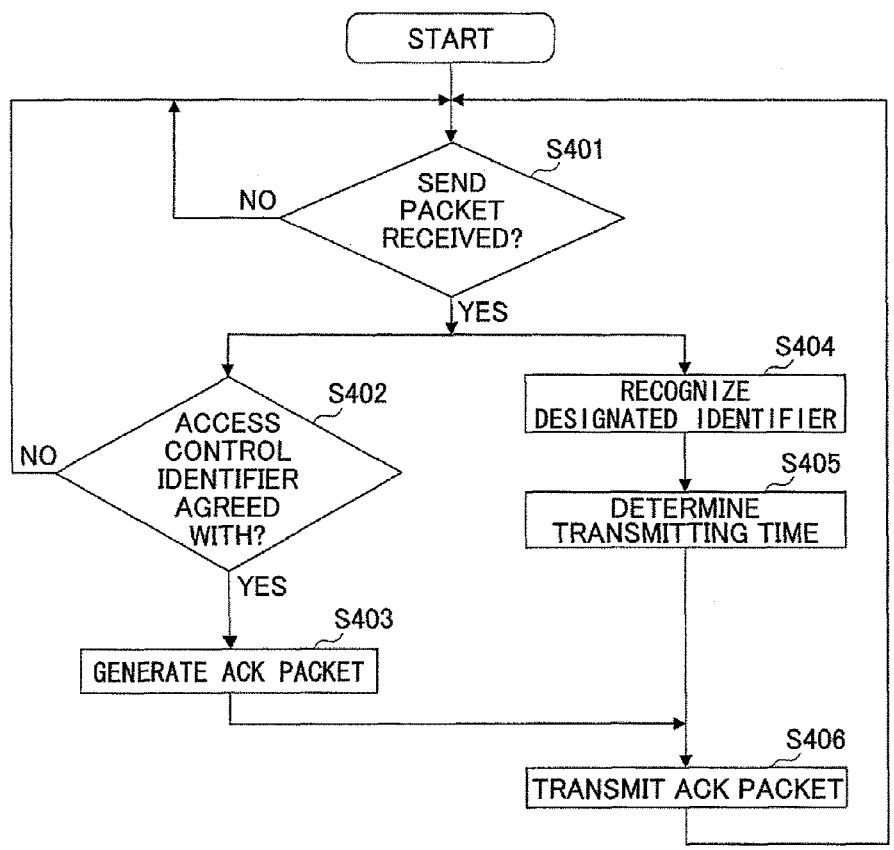
FIG. 17 depicts a flow chart for illustrating basic operation configuration example of each slave station in the communication system in each embodiment.

FIG. 17 depicts an operation flow chart of a basic operation example of the slave station described above with reference to FIG. 15.

In step S401, when the slave station receives a signal, the slave station determines whether the signal is of a SEND packet. When the signal is not of a SEND packet (NO in step S401), the slave station returns to step S401.

When the signal is of a SEND packet (YES in step S401), the slave station carries out both operation starting from step S402 and operation starting from S404.

The slave station determines in step S402 whether a condition indicated by an access control identifier of the received SEND packet is met by a situation of the own station. When the situation does not meet the condition (NO in step S402), the slave station recognizes that reply by the own station is not required, and returns to step S301.

When the condition indicated by the access control identifier of the received SEND packet is met by the situation of the own station (YES in step S402), the slave station recognizes that reply by the own station is required, and therefore, generates an ACK signal in step S403.

In step S404, the slave station recognizes a designated apparatus identifier of the received SEND packet, compares it with the own apparatus identifier, and determines, based on a comparison result, a time to transmit the ACK packet, in step S405.

In step S406, the slave station transmits the ACK packet generated in step S403 in a time determined in step S405, and returns to step S401.

Figure 18:
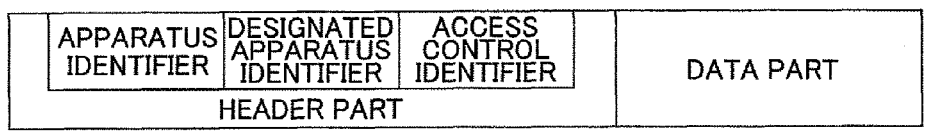
FIG. 18 illustrates one example of a configuration of a SEND packet in the communication system in each embodiment.
Figure 19:
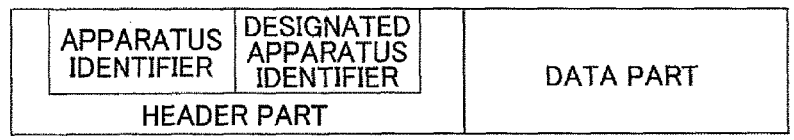
FIG. 19 illustrates one example of a configuration of an ACK packet in the communication system in each embodiment.

FIGS. 18 and 19 depict a configuration example of a SEND packet and a configuration example of an ACK packet, respectively in each embodiment mentioned above, respectively.

A SEND packet depicted in FIG. 18 has a header part and a data part, and the header part includes an apparatus identifier of a transmission source, a designated apparatus identifier, an access control identifier and so forth.

An ACK packet depicted in FIG. 19 has a header part and a data part, and the header part includes an apparatus identifier of a transmission source, a designated apparatus identifier and so forth.

FIG. 20 depicts a stored state of communication experiences in the RAM 11b or 31b of the control part 11 or 31 of the master station or the slave station.

The apparatus identifier obtained by the apparatus identifier analyzing part 21 or 40 shown in FIG. 14 or 15 is sent to the control part 11 or 31. Actually, the apparatus identifier and corresponding time information are sent to the control part 11 or 31. As a result, in the RAM, N records are stored in a time series manner, for the apparatus identifiers inside of the RAM. When new data is input in a state in which already the N records are stored in the RAM, the oldest record is deleted, and a new record corresponding to the new data is stored in the RAM. The above-mentioned N may be set arbitrarily.

Figure 21:
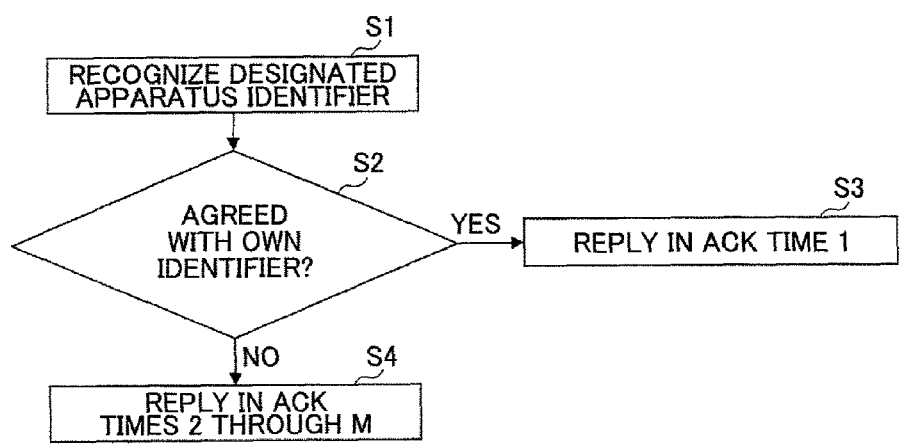
FIGS. 21, 22 and 23 illustrate methods for determining ACK packet reply times applicable to the communication system in each embodiment.
Figure 22:
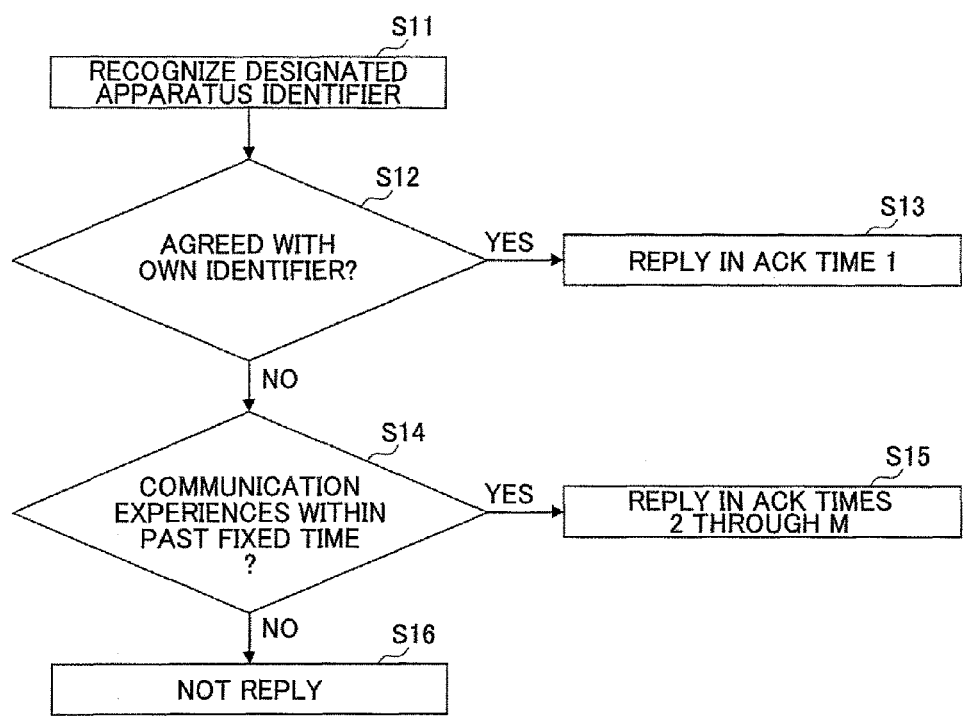
Figure 23:
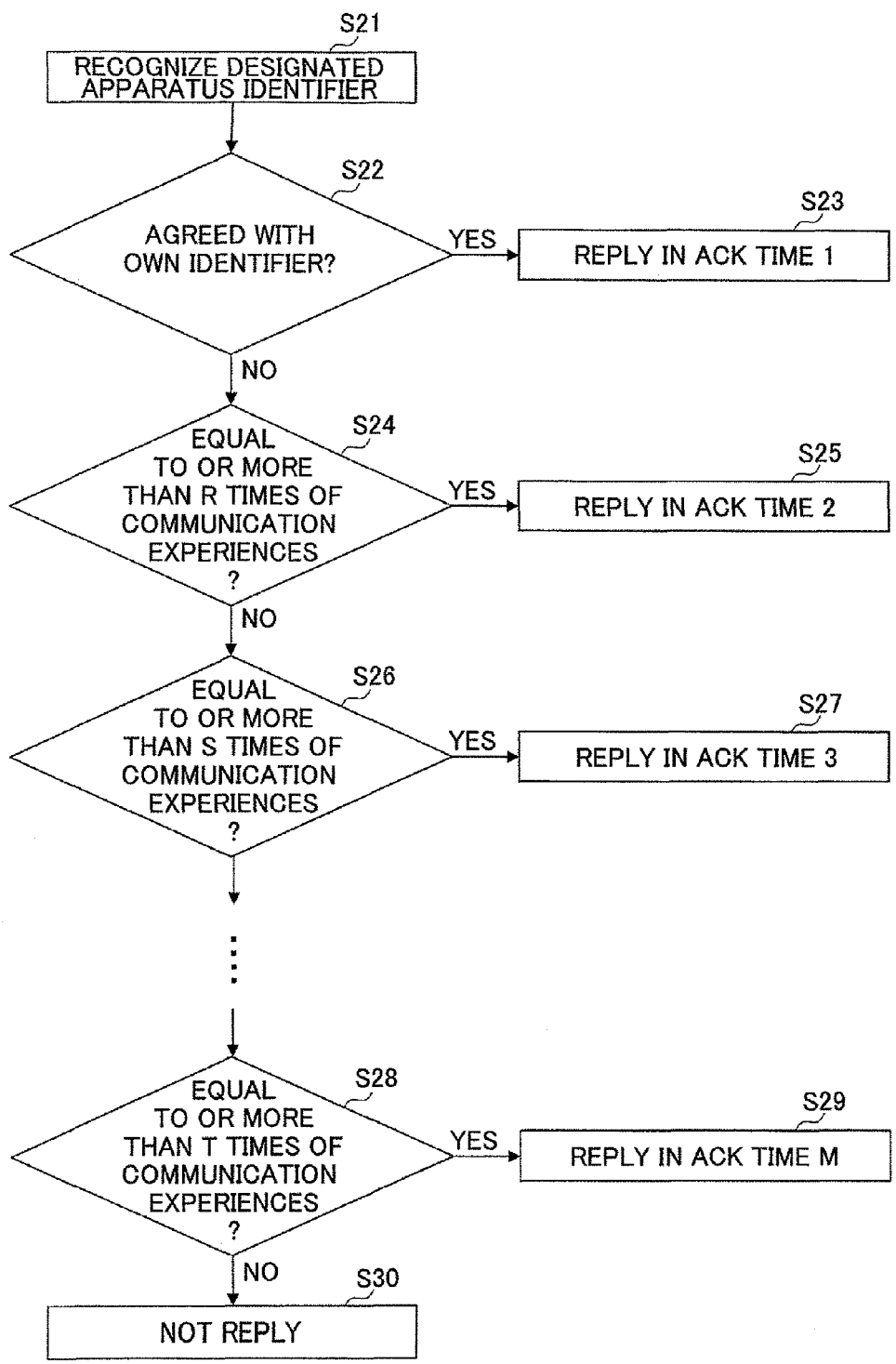

FIGS. 21, 22 and 23 depict operation flow charts of operation examples for determining a reply time of an ACK packet, applicable to each embodiment mentioned above.

FIG. 21 depicts an operation flow chart for a case where a condition indicated by an access control identifier included in a SEND packet has no relation to communication experiences.

In this case, the apparatus identifier analyzing part 21 or 40 recognizes a designated apparatus identifier (step S1), and, when the designated apparatus identifier agrees with the own apparatus identifier (YES in step S2), the second station replies with an ACK packet in an ACK time 1 (step S3). On the other hand, when the designated apparatus identifier does not agree with the own apparatus identifier (NO in step S2), the second station replies with an ACK packet in a time which is randomly selected from an ACK time 2 through an ACK time M subsequent to the ACK time 1 (step S4). M denotes the number of ACK times provided by a master station, and may be set arbitrarily. It is noted that the "ACK time" corresponds to the above-mentioned "ACK packet receiving time".

FIG. 22 depicts an operation flow chart for a case where an access control identifier included in a received SEND packet designates a second station having communication experiences with a transmission source.

The apparatus identifier analyzing part 21 or 40 recognizes a designated apparatus identifier in step S11 of FIG. 22. When the designated apparatus identifier agrees with the own apparatus identifier (YES in step S12), the second station replies with an ACK packet in an ACK time 1 in step S13. On the other hand, when the designated apparatus identifier does not agree with the own apparatus identifier (NO in step S12), the second station determines whether to have communication experiences with a master station having transmitted the SEND packet, in the stored communication experiences, from a current time to a time a predetermined time interval prior to the current time, in step S14.

When the communication experiences exist (YES in step S14), the station transmits an ACK packet in a time randomly selected from an ACK time 2 through am ACK time M subsequent to the ACK time 1, in step S15. M may be arbitrarily set.

FIG. 23 depicts an operation flow chart for a case where an access control identifier included in a received SEND packet determines a reply time of a second station having communication experiences with a transmission source according to the number of times of the communication experiences.

The apparatus identifier analyzing part 21 or 40 recognizes a designated apparatus identifier in step S21, and, the second station replies with an ACK packet in an ACK time 1 in step S23 when the designated apparatus identifier agrees with the own apparatus identifier (YES in step S22). When the designated apparatus identifier does not agree with the own apparatus identifier (NO in step S22), the second station obtains, from the stored communication experiences from a current time to a time a predetermined time interval prior to the current time, the number of times of communication experiences with a master station having transmitted the SEND packet, in step S24.

As a result of step S24, when the number of times of the communication experiences is equal to or more than R (YES in step S24), the station transmits an ACK packet in an ACK time 2 subsequent to the ACK time 1, in step S25. On the other hand, when the number of times of the communication experiences is less than R and equal to or more than S (R>S) (YES in step S26), the second station transmits an ACK packet in an ACK time 3 subsequent to the ACK time 2 in step S27. In the same operation is carried out until an ACK time M is reached (through step S29). M and the number of times R, S, . . . may be arbitrarily set.

It is noted that the ACK time M denotes the M-th ACK time set by the master station having transmitted the SEND packet.

Figure 24:
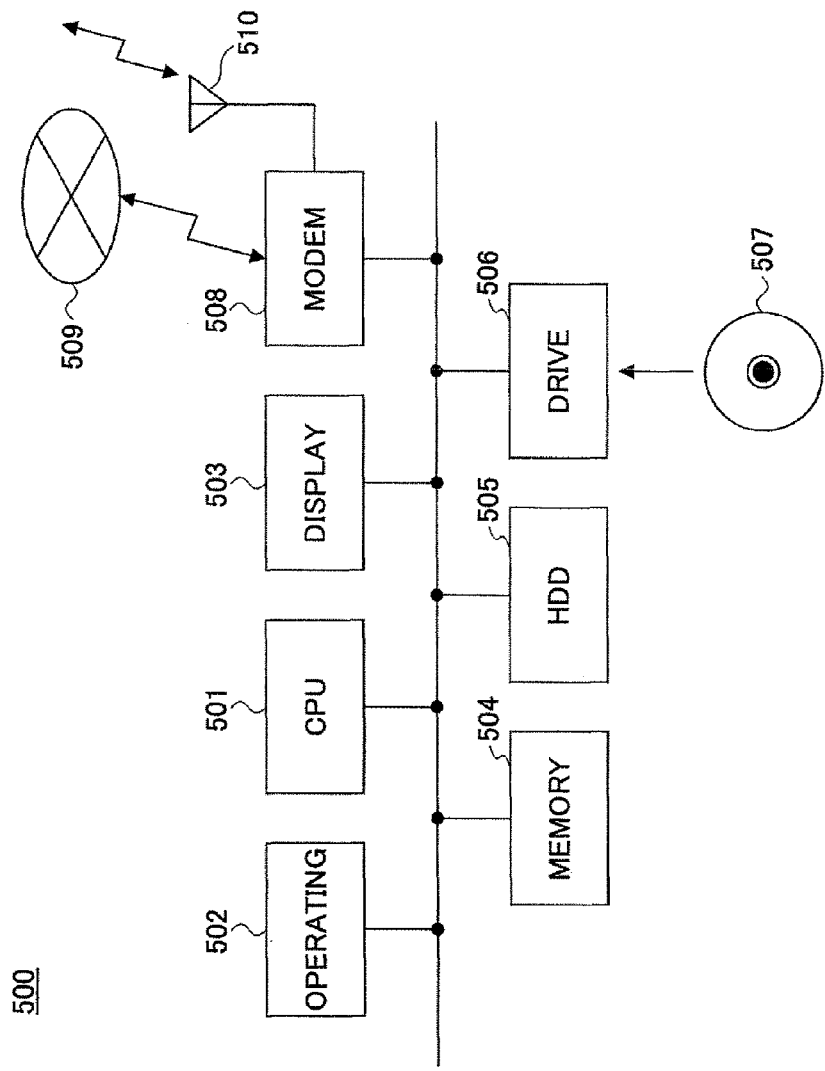
FIG. 24 depicts a block diagram of a computer for illustrating a case where a computer is used as each radio communication station applicable to the communication system in each embodiment.

FIG. 24 depicts a hardware block diagram for illustrating a case where the master station or the slave station described above with reference to FIG. 14 or 15 is configured by a computer.

As depicted in FIG. 24, the computer 500 includes a CPU 501 carrying out various sorts of operation by executing instructions written in a given program or such, an operating part 502 such as a keyboard, a mouse and so forth, for a user to input desired operation contents or data, a display part 503 such as a CRT, a liquid crystal display device or such, for displaying to the user a processing result of the CPU 501 or such, a memory 504 such as a ROM, a RAM and so forth, for storing programs to be executed by the CPU 501, data and so forth, or, to be used as a work area by the CPU 501, a hard disk drive 505 for storing programs, data and so forth, a CD-ROM drive 506 for loading programs or data from the outside with the use of a CD-ROM 507, and a modem 508 for downloading programs, data and so forth from an external server via a communication network 509 such as the Internet, a LAN, a radio communication network or such. The computer 500 also has an antenna 510 for radio communication.

The computer 500 loads or downloads, via the CD-ROM 507 or the communication network 509, a program including instructions for causing the CPU 501 to carry out processing to be carried out by the above-mentioned master station or slave station. Then, the CPU 501 installs the program in the hard disk drive 505 and loads the program in the memory, and the CPU 501 executes the program. As a result, the computer 500 acts as the master station or the slave station.

The oscillator 15 or 23, the modulating part 14 or 33 and the demodulating part 18 or 37 depicted in FIG. 14 or 15 correspond to the modem 508 of FIG. 24. The other components, i.e., the ACK packet generating part 12 or 32, the SEND packet generating part 13, the packet analyzing part 19 or 38, the access control identifier analyzing part 20 or 39 and the apparatus identifier analyzing part 21 or 40 are realized by the CPU 501 as a result of the CPU 501 executing instructions of the program.

INDUSTRIAL APPLICABILITY

Below, an actually applicable field of the communication systems in the embodiment 1 through 5 described above will be described.

The communication system in each embodiment may be applied to an inter mobile radio station access method in which, master stations and slave stations are set in automobiles or vehicles, or set on the shoulder of a road, a master station transmits a SEND packet to a second master station or to a slave station, the second master station or the slave station having received the SEND packet replies with an ACK packet, and thus, communication of information such as safety information for obviating a danger or accident information may be carried out.

For development of vehicle-to-vehicle communication for the purpose of reducing car accident, approaching to a smooth traffic flow and so forth, Ministry of Land, Infrastructure, Transport and Tourism takes a leading part to carry out research and development of various types of vehicle-to-vehicle communication of ASV (Advanced Safety Vehicle (see Non-patent Document 1).

Further, radio communication protocols to be flexibly adapted to network topologies of vehicle-to-vehicle communication and road-to-vehicle communication which vary from moment to moment have been studied by manufacturers and universities. However, they have not been standardized yet.

Data to be communicated there may be safety information for obviating a danger and accident information, such as lane changing information (direction indicator information), braking information, speed information, accident information and so forth.

Figure 25:
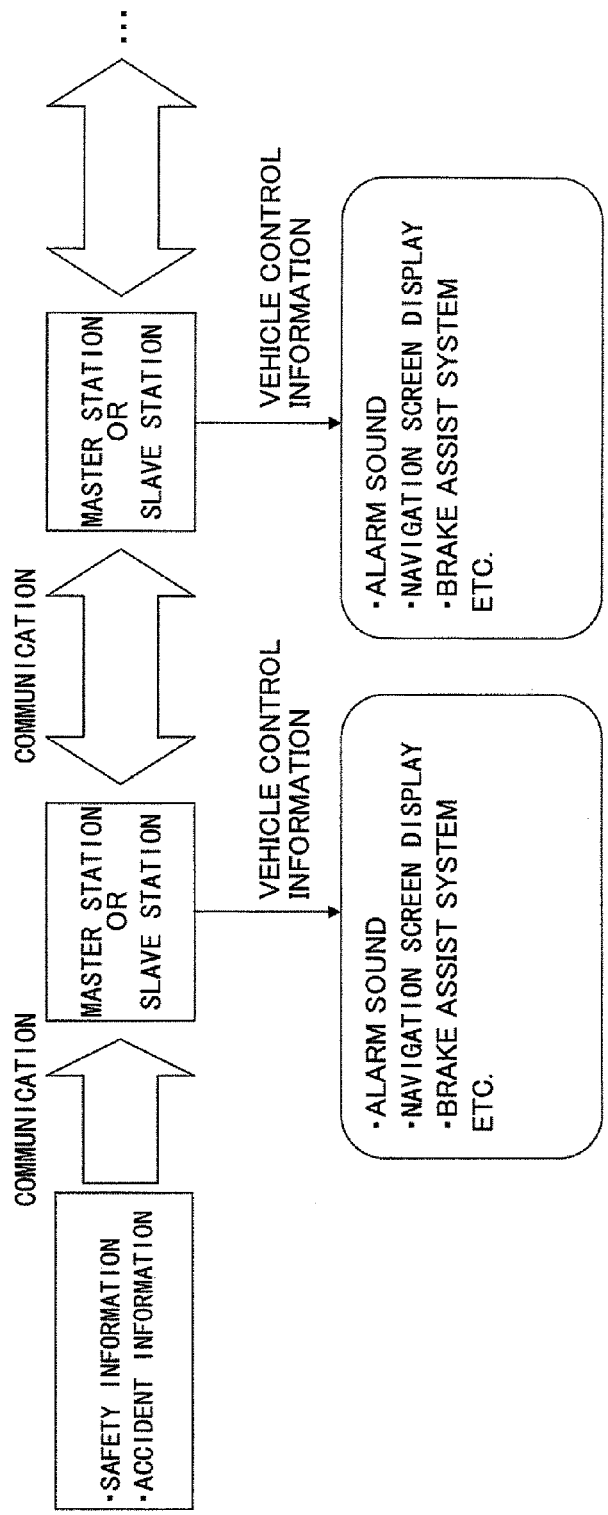
FIGS. 25, 26 and 27 illustrate examples for cases where the communication system in each embodiment is actually applied.

Then, as depicted in FIG. 25, when a master or slave station detects a danger from the safety information or accident information received from a surrounding station, the master or slave station carries out such control to cause alarm sound, display on a navigation screen, operate a bake assist system, and so forth, and also, transmit the information to surrounding master or slave stations.

Figure 26:
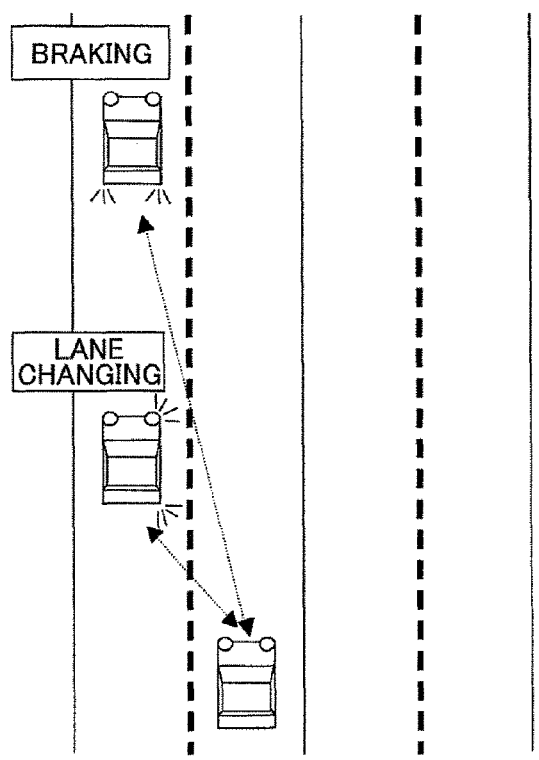

First, as communication for the above-mentioned safety information, information concerning the own vehicle's lane changing, baking information, speed information and so forth is transmitted to surrounding master or slave stations as depicted in FIG. 26.

Then, a master or slave station which receives such information may detect therefrom a danger or determine that attention is to be attracted, to cause alarm sound to call a driver's attention. Further, also, to the master or slave station which transmitted the information, the master or slave station having received the information may carry out communication for alarming the master or slave station which transmitted the information.

Further, in a case where a GPS is mounted in a vehicle, position information may be included in information to be transmitted to surrounding master and slave stations, a master and slave station having received the information may display corresponding position on a navigation screen of an own vehicle, and in cooperation therewith, when, in the master and slave station, a danger may be detected or it may be determined that attention is requested from the received information, a driver's attention may be attracted appropriately or a brake assist system may be used to avoid or an accident or reduce influence of an accident.

Further, also in a case where a vehicle receiving the accident information has a radar unit mounted therein, and the vehicle recognizes a location of a vehicle concerning an accident with the use a radar function and a communication function, the location may be displayed on a navigation screen of the vehicle having received the accident information, and, with the use of the information of the location, when a danger may be detected or it may be determined that attention is to be attracted, a driver's attention may be attracted appropriately or a brake assist system may be used to avoid an accident or reduce influence of an accident.

Figure 27:
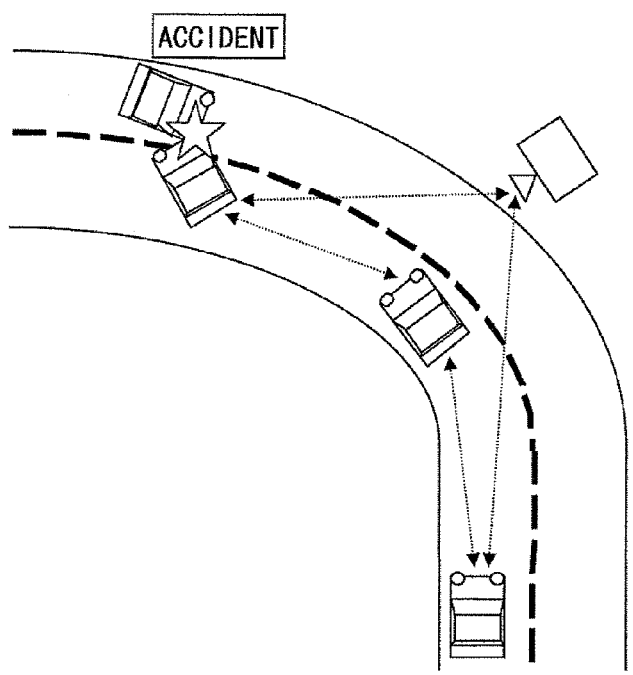

Further, as communication concerning the above-mentioned accident information, a vehicle having caused a traffic accident may transmit information thereof to surrounding vehicles. A surrounding master and slave station having received the information may cause alarm sound and/or display the information on a navigation screen of an own vehicle. Further, the surrounding master and slave station having received the accident information may further transmit the information to further surrounding master and slave stations. Thereby, as depicted in FIG. 27, even if the accident has occurred in a blind place such as a blind corner or a road, the accident can be recognized by surrounding master and slave stations and corresponding drivers' attentions may be thus attracted.

It is noted that, as a method by which a vehicle having caused a traffic accident can recognize the traffic accident, it may be possible that the vehicle can recognize the accident in a case where an airbag operated, or a collision sensor may be set inside of a bumper for detecting a collision and the collision sensor detects the accident, whereby the accident may be recognized by the corresponding vehicle.

Further, in a case where the vehicle having caused the accident has a GPS (i.e., Global Positioning System) mounted therein, the information to be transmitted to the surrounding master or slave stations may include accident location information. Thereby, a surrounding master or slave station having received the information may display the location on a navigation screen of an own vehicle, and a driver's attention may be attracted. Further, in a case where the accident location is approached, a brake assist system or such of the vehicle having the surrounding master or slave station may be operated, so that a second accident may be avoided or an influence of a second accident may be reduced.

Further, also in a case where the vehicle having received accident information has the radar unit mounted therein and can recognize the location of the vehicle having caused the accident with the use of radar function and a communication function, the vehicle having received the accident information may display the location in a navigation screen, and a driver's attention may be attracted. Further, in a case where the accident location is approached, a brake assist system or such of the vehicle having received the accident information may be operated, so that a second accident may be avoided or an influence of a second accident may be reduced.

Thus, by applying the communication in each embodiment mentioned above as a system to achieve the above-mentioned communication concerning the safety information and communication concerning the accident information, it is possible to effectively control, with an access control identifier, the number of stations which respond, even when many surrounding stations exist, and thus, data collision can be reduced.

Further, by communicating preferentially with a master or slave station having communication experiences or by communicating with master or slave stations in an order of the number of communication experiences of each of these master or slave stations, it is possible to, to the utmost, timely respond to such a situation of a vehicle as sudden lane changing or brake operation, the vehicle having the master or slave station.

Further, by carrying out communication with designating an apparatus identifier, it is possible to positively receive information of sudden lane changing or brake operation of a vehicle having the master or slave station without fail, and to timely respond to a corresponding situation.

Further, by using the radar function, it is possible to obtain a distance to a second station and relative speed information concerning the second station. Thereby, it is possible to recognize a detailed position and situation of the second station. As a result, by communicating with the second station which runs side by side or following the own station with designating an apparatus identifier thereof, it is possible to positively receive information of sudden lane changing or brake operation of a vehicle having the second station without fail, and to timely and appropriately respond to a corresponding situation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A radio communication system comprising:
a first radio communication station configured to transmit a radio signal; and
a plurality of second radio communication stations configured to receive the radio signal transmitted by the first radio communication station,
wherein the radio signal transmitted by the first radio communication station includes information for designating a condition for selecting a radio communication counterpart of the first radio communication station from the second radio communication stations, the condition for selecting the radio communication counterpart including whether the radio communication counterpart is moving and communication experiences with the first radio communication station, and
each of the second radio communication stations is configured to transmit a response radio signal when the second radio communication station determines that the second radio communication station meets the condition that the radio communication counterpart is moving and has the communication experiences with the first radio communication station within a past predetermined time.

2. The radio communication system as claimed in claim 1, wherein:
the condition for selecting the radio communication counterpart further includes a type of the radio communication counterpart, and
each of the second radio communication stations is configured to transmit the response radio signal when the second radio communication station determines that the second radio communication station meets the condition that the radio communication counterpart is moving, has the communication experiences with the first radio communication station within the past predetermined time, and meets the condition concerning the type of the radio communication counterpart.

3. The radio communication system as claimed in claim 1, wherein:
each of the second radio communication stations is configured to transmit the response radio signal in a time determined according to past communication experiences with the first radio communication station, and
each of the second radio communication stations is configured to transmit the response radio signal in a time which is earlier as the number of the communication experiences with the first radio communication station is larger.

4. The radio communication system as claimed in claim 1, wherein:
the first radio communication station is mounted in a first vehicle, and each of the second radio communication stations is mounted in a second vehicle or comprises a predetermined fixed station, and
the first radio communication station is configured to specify one or more of the second radio communication stations which one or more transmit the response radio signal in response to the information transmitted by the first radio communication station, and the first radio communication station is configured to transmit information notifying the specified one or more of the second radio communication stations of a driving state of the first vehicle.

5. A radio communication apparatus comprising:
a transmitting part configured to transmit a radio signal including information for designating a condition for selecting a radio communication counterpart of the radio communication apparatus from a plurality of other radio communication apparatuses, the condition for selecting the radio communication counterpart including whether the radio communication counterpart is moving and communication experiences with the radio communication apparatus, so that one or more of the other radio communication apparatuses transmit a response radio signal in response to reception of the radio signal transmitted by the radio communication apparatus when the one or more of the other radio communication apparatuses determine that the one or more of the other radio communication apparatuses meet the condition that the radio communication counterpart is moving and have the communication experiences with the radio communication apparatus within a past predetermined time.

6. A radio communication apparatus comprising:
a receiving part configured to receive a radio signal transmitted from another radio communication apparatus, the radio signal including information for designating a condition for selecting a radio communication counterpart of the other radio communication apparatus from a plurality of radio communication apparatuses, the condition for selecting the radio communication counterpart including whether the radio communication counterpart is moving and communication experiences with the other radio communication apparatus having transmitted the radio signal; and
a transmitting part configured to transmit a response radio signal if the radio communication apparatus determines that the radio communication apparatus meets the condition that the radio communication counterpart is moving and has the communication experiences with the other radio communication apparatus within a past predetermined time.

7. The radio communication apparatus as claimed in claim 6, wherein:
the transmitting part is configured to transmit the response radio signal in a time determined according to past communication experiences with the other radio communication station, and
the transmitting part is configured to transmit the response radio signal in a time which is earlier as the number of the communication experiences with the other radio communication station is larger.

8. A radio communication method comprising:
a first radio communication station transmitting a radio signal including information for designating a condition for selecting a radio communication counterpart of the first radio communication station from a plurality of second radio communication stations, the condition for selecting the radio communication counterpart including whether the radio communication counterpart is moving and communication experiences with the first radio communication station; and
one or more of the second radio communication stations transmitting a response radio signal in response to reception of the radio signal transmitted by the first radio communication station when the one or more of the second radio communication stations determine that the one or more of the second radio communication stations meet the condition that the radio communication counterpart is moving and have the communication experiences with the radio communication apparatus within a past predetermined time.

\* \* \* \* \*